US012120615B2

United States Patent
Al-Mufti et al.

(10) Patent No.: US 12,120,615 B2
(45) Date of Patent: Oct. 15, 2024

(54) SYSTEMS AND METHODS FOR PROVIDING PLANNED SPECTRUM ALLOCATION FOR SHARED SPECTRUM

(71) Applicant: Outdoor Wireless Networks LLC, Claremont, NC (US)

(72) Inventors: Khalid W. Al-Mufti, Sterling, VA (US); Ariful Hannan, Sterling, VA (US)

(73) Assignee: Outdoor Wireless Networks LLC, Claremont, NC (US)

( * ) Notice: Subject to any disclaimer, the term of this patent is extended or adjusted under 35 U.S.C. 154(b) by 304 days.

(21) Appl. No.: 17/703,632

(22) Filed: Mar. 24, 2022

(65) Prior Publication Data
US 2022/0346030 A1    Oct. 27, 2022

Related U.S. Application Data

(60) Provisional application No. 63/178,337, filed on Apr. 22, 2021, provisional application No. 63/178,368, (Continued)

(51) Int. Cl.
*H04W 72/0453*    (2023.01)
*H04W 4/02*    (2018.01)
*H04W 16/10*    (2009.01)
*H04W 40/24*    (2009.01)
*H04W 52/24*    (2009.01)
*H04W 52/36*    (2009.01)
(Continued)

(52) U.S. Cl.
CPC ......... *H04W 52/243* (2013.01); *H04W 4/025* (2013.01); *H04W 16/10* (2013.01); *H04W 40/246* (2013.01); *H04W 52/367* (2013.01); *H04W 72/0453* (2013.01); *H04W 72/541* (2023.01); *H04W 16/14* (2013.01); *H04W 84/042* (2013.01)

(58) Field of Classification Search
CPC ....... H04W 52/24; H04W 4/02; H04W 16/10; H04W 40/24; H04W 52/36; H04W 72/0453; H04W 72/541; H04W 16/14; H04W 84/04
See application file for complete search history.

(56) References Cited

U.S. PATENT DOCUMENTS 8,040,844 B2    10/2011    Olexa et al.
10,681,560 B1    6/2020    Sevindik et al.
(Continued)

OTHER PUBLICATIONS

U.S. Patent and Trademark Office, "Notice of Allowance", U.S. Appl. No. 17/720,056, filed Jan. 11, 2024, pp. 1 through 16, Published: US.
(Continued)

*Primary Examiner* — Hassan A Phillips
*Assistant Examiner* — Prenell P Jones
(74) *Attorney, Agent, or Firm* — Fogg & Powers LLC

(57) ABSTRACT

Techniques are provided for more efficiently determining frequency spectrum to allocate to General Authorized Access (GAA) citizens broadband radio service device(s) (CBSD(s)). Efficiency is enhanced by reducing a number of sets of frequency spectrum(s) by reducing a number of colors (assigned to nodes of connected set(s) of the network graph(s)) to which assignable frequency spectrum changes amongst the set(s).

18 Claims, 17 Drawing Sheets

Related U.S. Application Data filed on Apr. 22, 2021, provisional application No. 63/178,392, filed on Apr. 22, 2021.

(51) Int. Cl.
  *H04W 72/541* (2023.01)
  *H04W 16/14* (2009.01)
  *H04W 84/04* (2009.01)

(56) References Cited

U.S. PATENT DOCUMENTS

| | | | |
|---|---|---|---|
| 10,999,844 | B2 | 5/2021 | Sevindik et al. |
| 11,451,969 | B2 | 9/2022 | Furuichi et al. |
| 11,617,087 | B2 | 3/2023 | Cimpu et al. |
| 2006/0263252 | A1 | 11/2006 | Sanchez-Olea et al. |
| 2008/0112360 | A1 | 5/2008 | Seidel et al. |
| 2009/0088083 | A1 | 4/2009 | Fujii et al. |
| 2010/0330919 | A1 | 12/2010 | Gurney et al. |
| 2015/0092700 | A1 | 4/2015 | Li et al. |
| 2015/0119059 | A1 | 4/2015 | Miao et al. |
| 2015/0264135 | A1 | 9/2015 | Kandula et al. |
| 2016/0004787 | A1 | 1/2016 | Shinkuma et al. |
| 2016/0088485 | A1 | 3/2016 | Guo et al. |
| 2016/0182139 | A1 | 6/2016 | Yi et al. |
| 2017/0208474 | A1 | 7/2017 | Mody et al. |
| 2017/0318470 | A1* | 11/2017 | Srikanteswara .... H04W 52/367 |
| 2017/0374558 | A1 | 12/2017 | Zhao et al. |
| 2018/0139616 | A1 | 5/2018 | Khoshnevisan et al. |
| 2019/0007909 | A1 | 1/2019 | Mueck et al. |
| 2019/0141713 | A1* | 5/2019 | Cimpu ................ H04W 72/541 |
| 2019/0174359 | A1 | 6/2019 | Hannan |
| 2019/0223037 | A1 | 7/2019 | Raghothaman |
| 2019/0327765 | A1* | 10/2019 | Mukherjee ............ H04W 16/14 |
| 2020/0053669 | A1 | 2/2020 | Hannan et al. |
| 2020/0162929 | A1* | 5/2020 | Cimpu ................ H04J 11/0026 |
| 2020/0187133 | A1 | 6/2020 | Syed et al. |
| 2020/0351899 | A1 | 11/2020 | Sun et al. |
| 2021/0044984 | A1 | 2/2021 | Sun et al. |
| 2021/0076223 | A1 | 3/2021 | Taneja et al. |
| 2021/0144724 | A1 | 5/2021 | Macmullan et al. |
| 2021/0160743 | A1* | 5/2021 | Pazhyannur ...... H04W 36/0083 |
| 2021/0211880 | A1 | 7/2021 | Khawer et al. |
| 2021/0337391 | A1 | 10/2021 | Sevindik et al. |
| 2021/0345121 | A1 | 11/2021 | Cimpu |
| 2021/0345352 | A1 | 11/2021 | Zhao et al. |
| 2021/0400498 | A1 | 12/2021 | Ioffe et al. |
| 2022/0095264 | A1 | 3/2022 | Cook |
| 2022/0224408 | A1 | 7/2022 | Al-Mufti et al. |
| 2022/0225109 | A1 | 7/2022 | Al-Mufti et al. |
| 2022/0345895 | A1 | 10/2022 | Al-Mufti et al. |
| 2022/0346029 | A1 | 10/2022 | Al-Mufti et al. |
| 2022/0400487 | A1 | 12/2022 | Sevindik |
| 2023/0007668 | A1 | 1/2023 | Al-Mufti et al. |
| 2023/0012713 | A1 | 1/2023 | Khalid et al. |
| 2023/0071539 | A1 | 3/2023 | Dijkstra et al. |
| 2023/0093833 | A1 | 3/2023 | Hafeez et al. |

OTHER PUBLICATIONS

U.S. Patent and Trademark Office, "Office Action", U.S. Appl. No. 17/572,410, dated Mar. 5, 2024, pp. 1 through 20, Published: US.

Wireless Innovation Forum, "WINNF-SSC-0010, Signaling Protocol and Procedures for Citizens Broadband Radio Service (CBRS): Winnforum Recognized CBRS Grouping Information" V4.2.0, Jun. 30, 2021, pp. Title page through 8.

Wireless Innovation Forum, "WINNF-TS-0061, Test and Certification for Citizens Broadband Radio Service (CBRS); Conformance and Performance Test Technical Specifictation; SSA as Unit Unter Test (UUT)", V1.5.1, Oct. 7, 2019, pp. Title Page through 180.

Wireless Innovation Forum, WINNF-TS-0112, Requirements for Commercial Operation in the U.S. 3550-3700 MHZ Citizens Broadband Radio Service Band, V1.9.1, Mar. 11, 2020, pp. Title page through 76.

Wireless Innovation Forum, "WINNF-TS-0112, Requirements for Commercial Operation in the U.S. 3550-3700 MHZ Citizens Broadband Radio Service Band" V1.4.1, Jan. 16, 2018, pp. Title Page through 69.

U.S. Patent and Trademark Office, "Notice of Allowance", U.S. Appl. No. 17/703,640, dated Feb. 5, 2024, pp. 1 through 13, Published: US.

U.S. Patent and Trademark Office, "Office Action", U.S. Appl. No. 17/703,640, filed Oct. 6, 2023, pp. 1 through 11, Published: US.

U.S. Patent and Trademark Office, "Office Action", U.S. Appl. No. 17/571,807, dated Aug. 29, 2024, pp. 1 through 35, Published: US.

\* cited by examiner

SYSTEMS AND METHODS FOR PROVIDING PLANNED SPECTRUM ALLOCATION FOR SHARED SPECTRUM

CROSS-REFERENCE TO RELATED APPLICATIONS

The present application claims benefit of U.S. Patent Application Ser. No. 63/178,337 filed Apr. 22, 2021, U.S. Patent Application Ser. No. 63/178,368 filed Apr. 22, 2021, and U.S. Patent Application Ser. No. 63/178,392 filed Apr. 22, 2021; the entire contents of each of the aforementioned patent applications are incorporated herein by reference as if set forth in their entirety.

BACKGROUND

A citizens broadband radio service (CBRS) includes incumbent users of shared spectrum and secondary users of shared spectrum. An incumbent user may also be referred to as a primary user or an incumbent. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding interference threshold levels for each of such incumbent user(s) and secondary user(s).

Such secondary users use citizens broadband radio service device(s) (CBSD(s)). A CBSD is a radio including a transmitter coupled to an antenna. A CBRS system includes a spectrum access system (SAS) which regulates the transmissions of CBSD(s) in shared spectrum under the SAS's control, e.g., whether each CBSD of a SAS can transmit in the shared spectrum, and if so, then at what power level, to ensure that aggregate interference at incumbent users and other CBSDs is within appropriate limits. The SAS also may include a function to coordinate the shared spectrum usage among secondary users that are General Authorized Access (GAA) CBSDs to diminish interference between GAA CBSDs and to regulate interference from GAA CBSD(s) at certain location(s), e.g., geographic location(s) of incumbent user(s), of protection area(s), and of exclusion zone(s).

A requesting secondary user is a user requesting to transmit in shared spectrum controlled by a SAS and shared with incumbent user(s) and/or other secondary user(s) whose transmission(s) are controlled by the SAS. The SAS authorizes the requesting secondary user to transmit in the spectrum shared with incumbent user(s) and/or the other secondary user(s) controlled by the SAS.

Typically, a SAS evaluates the requests from requesting secondary users at planned times, e.g., once a day at a certain time, when it determines whether secondary user(s) who have requested to transmit in the shared spectrum can do so and at what maximum transmit power level. Because the SAS makes such determinations based upon interference at and due to CBSDs controlled by either the SAS and/or other SAS(s), a significant amount of computation is required. As a result, an amount of resources and cost to perform planned spectrum coordination, or analysis, may be undesirably large.

SUMMARY OF THE INVENTION

A method is provided for efficiently enhancing a function of an indicium of an aggregate of a product of bandwidth and maximum transmit power spectral density allocated to each of at least one general authorized access (GAA) radio. The method comprises: receiving co-existence data about at least the one GAA radio; identifying zero or more edges, wherein an edge is formed between two nodes, wherein an edge means that a criterion of interference at a GAA radio or a node consisting of at least one GAA radio exceeds an edge interference threshold level; generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free mean a level of interference below a threshold level of interference, wherein the allocating the frequency spectrum and maximum transmit power comprises: identifying at least one protection point having an indicium of aggregate reduction of transmission power above a first indicium threshold level; for each identified protection point, determining at least one GAA radio having an indicium of a reduction of transmission power greater than a transmission power reduction threshold level, where each identified GAA radio comprises a node of a connected set; for at least one identified protection point, obtaining a diminished number of sets of at least one frequency spectrum for each connected set for the determined at least one GAA radio; for each obtained set of at least one frequency spectrum, determining an indicium of aggregate reduction of transmission power for GAA radios that are geographically located in a neighborhood of a corresponding identified protection point; and for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

A non-transitory computer readable medium is provided that stores a program causing at least one processor to execute a process for efficiently enhancing a function of an indicium of an aggregate of a product of bandwidth and maximum transmit power spectral density allocated to each of at least one general authorized access (GAA) radio. The process comprises: receiving co-existence data about at least the one GAA radio; identifying zero or more edges, wherein an edge is formed between two nodes, wherein an edge means that a criterion of interference at a GAA radio or a node consisting of at least one GAA radio exceeds an edge interference threshold level; generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises: identifying at least one protection point having an indicium of aggregate reduction of transmission power above a first indicium threshold level; for each identified protection point, determining at least one GAA radio having an indicium of a reduction of transmission power greater than a transmission power reduction threshold level, where each identified GAA radio comprises a node of a connected set; for at least one identified protection point, obtaining a diminished number of sets of at least one frequency spectrum for each connected set for the determined at least one GAA radio; for each obtained set of at least one frequency spectrum, determining an indicium of aggregate reduction of transmission power for GAA radios that are geographically located in a neighborhood of a corresponding identified protection point; and for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

A system, for efficiently enhancing a function of an indicium of an aggregate of a product of bandwidth and maximum transmit power spectral density allocated to each of at least one general authorized access (GAA) radio, is provided. The system comprises processing circuitry configured to: receive co-existence data about at least the one GAA radio; identify zero or more edges, wherein an edge is formed between two nodes, wherein an edge means that a criterion of interference at a GAA radio or a node consisting of at least one GAA radio exceeds an edge interference threshold level; generate at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocate a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises: identify at least one protection point having an indicium of aggregate reduction of transmission power above a first indicium threshold level; for each identified protection point, determine at least one GAA radio having an indicium of a reduction of transmission power greater than a transmission power reduction threshold level, where each identified GAA radio comprises a node of a connected set; for at least one identified protection point, obtain a diminished number of sets of at least one frequency spectrum for each connected set for the determined at least one GAA radio; for each obtained set of at least one frequency spectrum, determine an indicium of aggregate reduction of transmission power for GAA radios that are geographically located in a neighborhood of a corresponding identified protection point; and for at least one identified protection point, select an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

DRAWINGS

Comprehension of embodiments of the invention is facilitated by reading the following detailed description in conjunction with the annexed drawings, in which.

Figure 7:
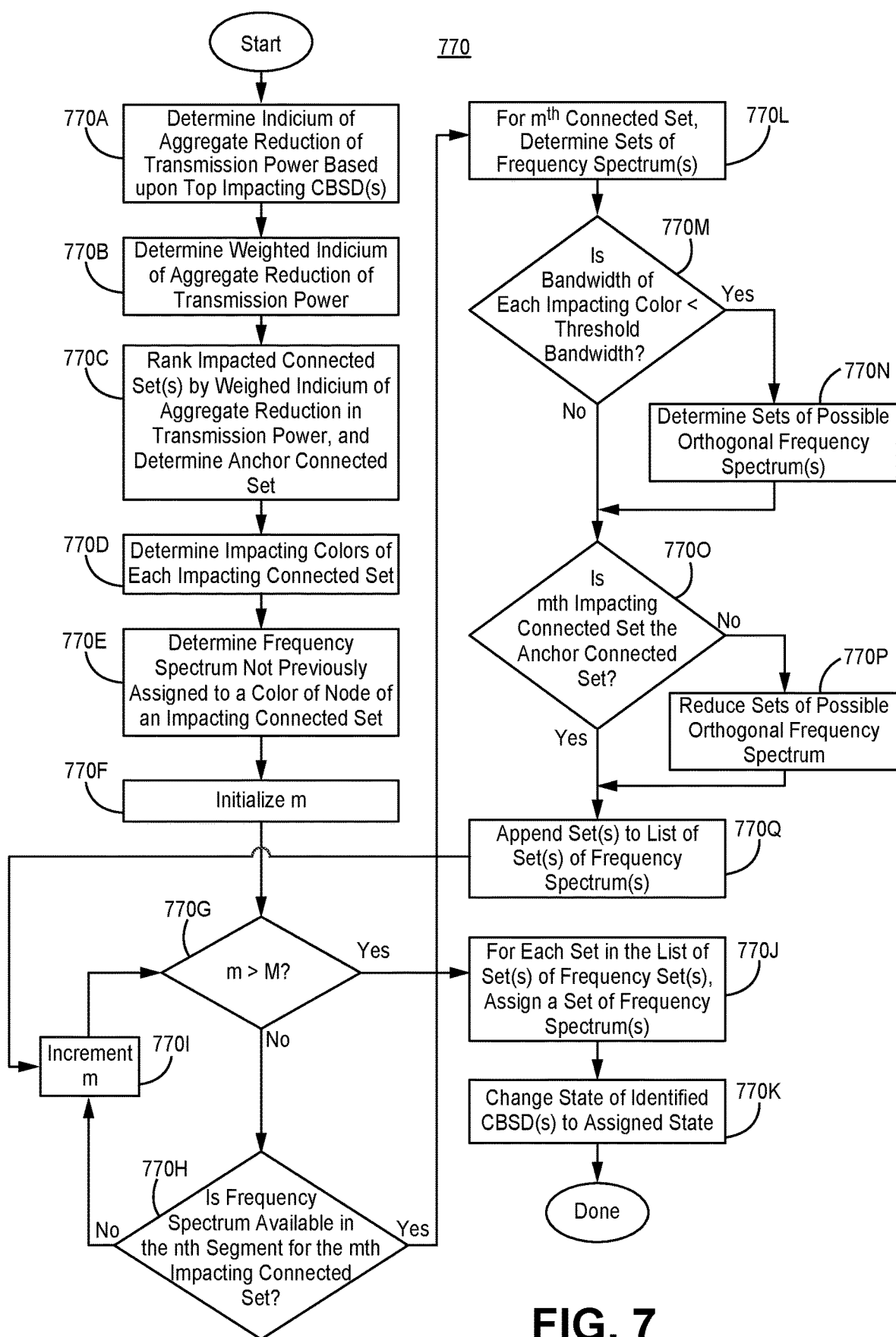
Figure 8:
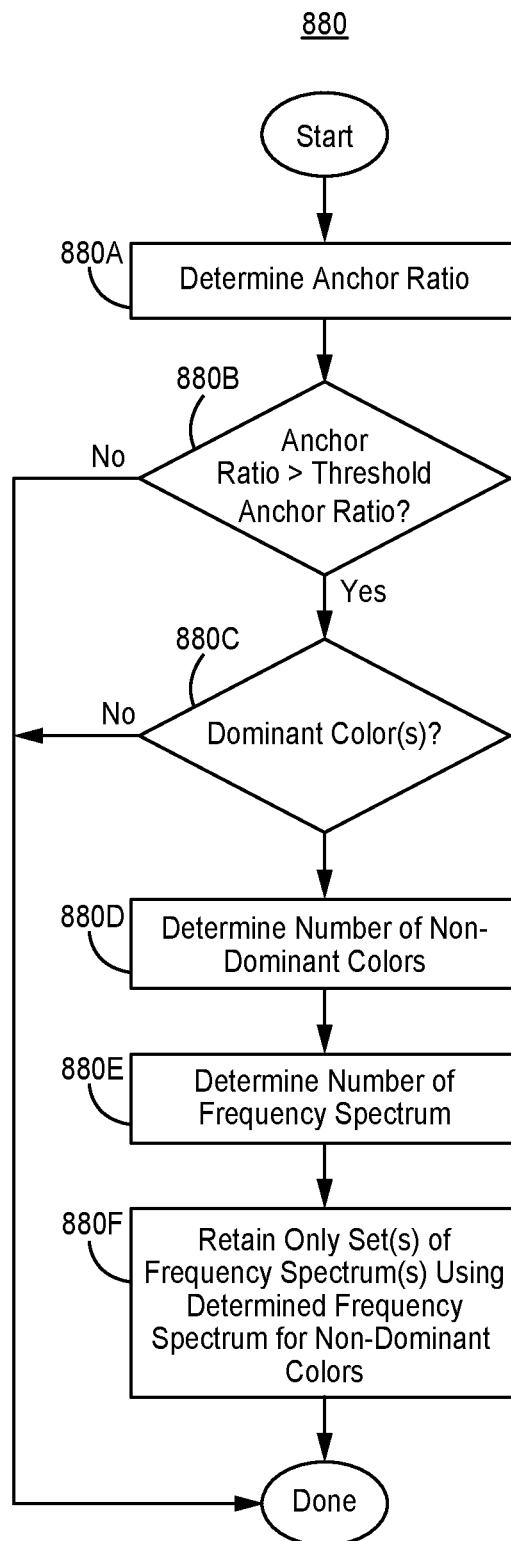
Figure 9:
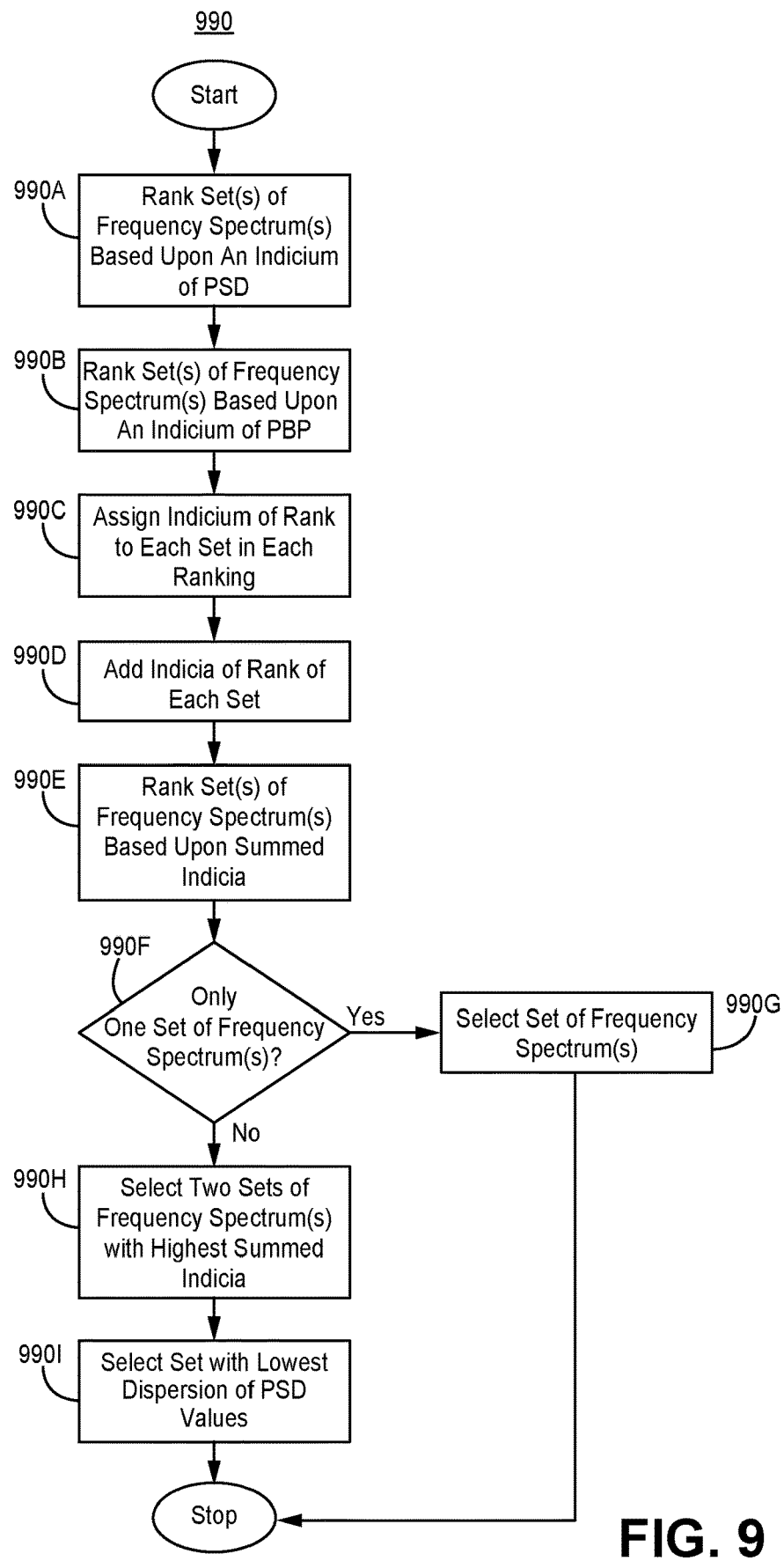

FIG. 7 illustrates a flow diagram of one embodiment of a method 770 of determining a set of frequency spectrums for an nth segment—if possible, e.g., block 660C. The illustrated technique seeks to diminish the number of set(s) of frequency spectrum(s). By doing so, computational requirements are diminished when determining an indicium of aggregate reduction of transmission power;

FIG. 8 illustrates a flow diagram of one embodiment of a method for reducing a number of sets of possible orthogonal frequency spectrum(s); and FIG. 9 illustrates a flow diagram of one embodiment of a method of selecting one set of frequency spectrum(s).

DETAILED DESCRIPTION

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Shared spectrum (or shared frequency spectrum) means frequency spectrum utilized by: (a) incumbent user(s) (e.g., a receiver of a fixed satellite service (F SS)) and/or geographic region(s) to be maintained interference free (e.g., a grandfather wireless protection zone (GWPZ) or priority access license (PAL) protection area (PPA), a geographic location of an environmental sensing capability (ESC) system receiver(s) and/or an exclusion zone) and (b) at least one of priority access licensee (PAL) CBSD(s) and GAA CBSD(s). The CBSD may be a GAA or a priority access license (PAL) CBSD. Optionally, threshold levels mentioned herein may be set by a system designer and/or a system user.

A protection point means a point representing actual and/or potential incumbent user(s) and/or geographic regions which are to remain free of interference (as that term is defined herein) from CBSDs. Network graph means at least one connected set where there are no pairs of nodes that are connected with edge and have the same color. Optionally, a network graph means the network graph defined above, and further where at least one CBSD (comprising at least one node of each connected set) is geographically located within a neighborhood of a protection point.

Embodiments of an invention provide techniques for diminishing computational resources, and thus increase computational efficiency, when performing planned spectrum coordination. Planned spectrum coordination (or planned spectrum allocation) means, at a planned time, allocating a frequency spectrum and a maximum transmit power, in shared spectrum, to each of at least one GAA CBSD so that GAA CBSD(s), and incumbent user(s) (e.g., represented by protection points) if any, are free of interference (as that term is defined herein) from each of the at least one GAA CBSD. Optionally, planned spectrum coordination is performed by a SAS, e.g., a processing system of a SAS. Planned spectrum coordination determines a set of frequency spectrum(s) (to be allocated to nodes (each of which comprises GAA CBSD(s)) of a network graph) that enhances, e.g., maximizes, an indicium of an aggregate of a product of bandwidth and maximum transmit power spectral density allocated to each CBSD authorized to transmit in the shared spectrum. Optionally, two or more frequency spectrums of a set of frequency spectrum (to be allocated to nodes (each of which comprises GAA CBSD(s)) of a network graph) are orthogonal; thus, further optionally, each color allocated to a node of a connected set may be assigned a frequency spectrum that is orthogonal to frequency spectrum(s) assigned to other color(s) allocated to other node(s) of the connected set. The product of the bandwidth and the maximum transmit power (of each GAA CBSD authorized to transmit in the shared spectrum) may also be referred to herein as power bandwidth product or bandwidth-maximum transmit power product, and is determined by multiplying a bandwidth of a frequency spectrum allocated to a color assigned to a node comprising the GAA CBSD. The indicium may be of an average, median, or mode. If time sharing of computational resources is utilized, e.g., cloud computing, then the cost of such time sharing may be reduced.

Computational efficiency is diminished at least by utilizing at least one of three different techniques, which can be performed separately or in different combinations. Combination(s) of frequency spectrum(s) may be referred to herein also set(s) of frequency spectrum(s); thus, those terms may be used interchangeably. The technique(s) can diminish a number of sets of frequency spectrum(s) allocatable to colors assigned nodes of connected set(s) comprising at least one network graph, and which must be analyzed to determine the set of frequency spectrum(s) that results in the enhanced indicium of an aggregate of a product of bandwidth and maximum transmit power allocated to each GAA CBSD transmitting in shared spectrum. As a result, fewer sets of frequency spectrum(s) must be analyzed to determine the indicium of an aggregate of a product of bandwidth and maximum transmit power allocated to each GAA CBSD transmitting in shared spectrum.

In an optional first technique, during the planned spectrum coordination, determination of the indicium of an aggregate of a product of bandwidth and maximum transmit power allocated to each GAA CBSD transmitting in shared spectrum, can be made more efficient by reducing a number of protection point(s) analyzed. The number of protection point(s) analyzed are those protection point(s) determined to have an indicium of aggregate reduction of transmit power that is higher than a first indicium threshold level. By diminishing a number of protection point(s) analyzed, a total number of combinations of frequency spectrum(s) which must be analyzed to determine a diminished level of aggregate interference at each protection point of the diminished set of protection points. Each combination of frequency spectrum(s) represents frequency spectrum(s) assigned to a unique color assigned to node(s) of a connected set. By diminishing the number combination(s) analyzed, computational efficiency is enhanced. The protection point(s), having an indicium of aggregate reduction of transmit power that is higher than the first indicium threshold level, during planned spectrum coordination have a larger likelihood of diminishing transmission power of GAA CBSD(s) in their neighborhood(s) when each GAA CBSD is co-channel with a frequency spectrum associated with a corresponding protection point. Thus, the other protection point(s) which are not analyzed during planned spectrum coordination would have a lower likelihood of diminishing such transmission power of GAA CBSD(s) in their neighborhood(s) when each GAA CBSD is co-channel with a frequency spectrum associated with a corresponding protection point, and thus are not to be considered. This technique may be used for any type of implementation of planned spectrum coordination, including a heuristic technique that does not utilize a second technique to enhance computational efficiency (which is subsequently described). The heuristic technique evaluates all possible set(s) of frequency spectrum(s) for all connected set(s) comprising a network graph.

In an optional second technique, the indicium of an aggregate of a product of bandwidth and maximum transmit power allocated to each GAA CBSD transmitting in shared spectrum, determined during the planned spectrum coordination, at each protection point can be made more computationally efficient by reducing a number of sets of frequency spectrum(s) by reducing a number of colors (assigned to nodes of connected set(s) of the network graph(s)) to which assignable frequency spectrum changes amongst the set(s). The reduced number of color(s) may be identified by determining the color(s) of node(s) comprising at least one GAA CBSD having an indicium of transmit adjustment power that is greater than a corresponding transmit adjustment power threshold level. The reduced number of color(s) results in fewer set(s) or combination(s) of frequency spectrum(s) which must be analyzed. By diminishing the number combination(s) analyzed, computational efficiency is enhanced.

The number of sets of frequency spectrum(s) is reduced as follows. Each set comprises at least one variable; each variable is a unique color. A color may be able to be assigned one or more frequency spectrums. This technique reduces a number of colors that may be assigned more than one frequency spectrum; thus, one or more colors can each be assigned only one frequency spectrum. A resulting number of combinations of frequency spectrums (or sets of frequency spectrum(s)) is reduced. Only the reduced number of combinations (or sets of frequency spectrum(s)) need be analyzed to determine the indicium of an aggregate, of a product of bandwidth and maximum transmit power allocated to each GAA CBSD transmitting in shared spectrum, is reduced. Thus, computational efficiency is enhanced.

In an optional third technique, connected sets comprising nodes of GAA CBSDs are separated to form interference groups. A connected set means a unique set of at least two nodes, where at least two of the nodes have an edge, or a unique node with no edge to any other node, where each node of the at least two nodes having an edge between the at least two nodes are assigned different colors, and where the number of colors assigned to nodes of the connected set is a minimum number of colors which can be assigned to each node of the connected set. Each of the interference group(s) may optionally be subsequently analyzed in parallel and substantially contemporaneously, e.g., using parallel processing; thus, computational efficiency is enhanced. By separating the connected sets into interference groups, a smaller number of sets of frequency spectrum(s) (allocatable to colors assigned nodes of the connected set(s) of an interference group) may be determined (e.g., by processing each interference group in parallel), thus, diminishing the computation time to determine the set of frequency spectrum(s) that results in the enhanced indicium of an aggregate of a product of bandwidth and maximum transmit power allocated to each GAA CBSD transmitting in shared spectrum. A set of nodes (SN) means at least two GAA CBSDs, where each GAA CBSD is geographically separated from at least one other GAA CBSD of the set by a geographic distance less than a first distance threshold level.

A set of nodes (or nodeset) means at least two nodes, where each node of the set of nodes is within a first distance of at least one other node of the set of nodes. A joint area means a union of neighborhoods of one or more protection points, wherein at least one GAA CBSD (of at least one node of the nodeset) is geographically located in at least one neighborhood of the union of neighborhoods. An interference group means (a) each nodeset comprising at least one node where each of the at least one node comprises at least one GAA CBSD geographically located in a joint area, or (b) a nodeset comprising at least one node, where each node of the nodeset comprises at least one GAA CBSD, and where none of GAA CBSDs of a node of the nodeset are geographically located in a joint area. Optionally, an interference group means (a) each nodeset comprising at least one node where each of the at least one node comprises at least one GAA CBSD geographically located in a joint area, or (b) at least one nodeset, where each nodeset comprises at least one node, where each node of the nodeset comprises at least one GAA CBSD, where none of GAA CBSDs of a node of the nodeset are geographically located in a joint area, and where at least one GAA CBSD of one node of a first nodeset is within a second distance of at least one GAA CBSD of another node of a second nodeset. Optionally, the first distance may be thirty kilometers; the second distance is a distance greater than the first distance, e.g., optionally forty kilometers. FIG. 2B illustrates a diagram of exemplary interference groups which are further described herein. Each GAA CBSD of the at least one set of nodes of has its transmissions controlled by a SAS or another (or a different) SAS.

Co-channel means frequency spectrum equal to or a subset of another frequency spectrum. Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum utilized by a receiver of an incumbent user or a PAL CBSD.

Co-existence data includes information about (a) incumbent user(s), (b) geographic region(s) to be maintained interference free, (c) PAL CBSD(s), and/or (d) GAA CBSD(s), including each's corresponding geographic location, frequency spectrum, interference threshold level, and/or interference margin (e.g., for an incumbent user configured to receive in the shared spectrum); the co-existence data further includes data about each CBSD, e.g., GAA CBSD, (including geographic location, data indicative of maximum capable transmit power, CBSD (e.g., GAA CBSD), group information, and/or any parameters of the CBSD's (e.g., GAA CBSD s), used to perform propagation modelling such as for example antenna radiation pattern and/or antenna height). Optionally, co-existence data only includes data about protection point(s) which have neighborhood(s) that encompass the geographic location of a CBSD. Frequency spectrum means a bandwidth centered about a center frequency. Node means at least one GAA CBSD, where if the node comprises two or more GAA CBSD(s), then each GAA CBSD utilizes the same frequency spectrum and is free of interference (as defined elsewhere herein) from each of the other GAA CBSD(s) comprising the node.

GAA CBSD group means (a) a group of GAA CBSDs whose interference is managed by a network operator so that no edge need be created between two nodes comprising such GAA CBSDs and/or (b) for a fixed wireless access GAA CBSDs, a base station GAA CBSD and consumer premises equipment configured to communicate with the base station GAA CBSD.

Unless otherwise indicated herein, power as used herein means power or power spectral density. Power levels for a shared spectrum system, such as a CBRS, are often characterized in terms of power spectral density levels. Optionally, power or power spectral density may be a level radiated by antenna(s) electrically coupled to a transmitter of a CBSD and characterized in terms of effective isotropic radiated power (EIRP).

A CBRS system comprises general authorized access (GAA) and/or priority access license (PAL) CBSDs, and incumbent users and geographic region(s) to be maintained free of interference. The incumbent users, such as government users fixed satellite service receiver(s), have priority access, with respect to secondary users such as CBSDs, to some or all of spectrum in the shared spectrum. When satisfying interference requirements, a SAS is configured to grant the CBSDs access to the shared spectrum, including authorizing frequency spectrum (or channels) requested by CBSDs, and authorizing a corresponding requested maximum transmission power or assigning a lower maximum transmission power. The SAS is configured to control the transmission of GAA CBSDs so that PAL CBSDs and the incumbent users are free of interference from GAA CBSDs. The GAA and PAL CBSDs are secondary users; the PAL CBSDs are secondary users because they have a lower priority than incumbent users. For example, PAL and GAA CBSDs have to also protect Environmental Sensing Capability (ESC) sensors which are used to detect radar transmissions, e.g., from naval ships, in the CBRS band. The SAS is also configured to control the transmission of PAL and GAA CBSDs so that incumbent users are free of interference from PAL and GAA CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g., of an incumbent user or a geographic region to be maintained interference free, is free of interference, whether the interference level is below the acceptable level of interference (or a threshold interference) is determined. The acceptable level of interference may vary by the type of incumbent user or geographic region, frequency spectrum, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Incumbent users of shared spectrum have first, or highest, priority to utilize the shared spectrum controlled by the SAS. Thus, incumbent users (e.g., the receivers of incumbent users' communications systems such as radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL CBSDs have second (or intermediate) priority, after incumbent users (excluding PAL users), to utilize the frequency spectrum controlled by the SAS. In another embodiment, a PAL user shall be able to operate, when incumbent users (excluding PAL CBSDs) are free of interference of such a PAL user, and free of interference from other PAL CBSDs and general authorized access users. In one embodiment, an ability of a PAL CBSD to operate free of interference shall be limited temporally, geographically, and spectrally within the specifications of its license.

GAA CBSDs have third, or lowest, priority to utilize the frequency spectrum controlled by the SAS. In one embodiment, an operation of GAA CBSDs will be governed by laws, regulations, and/or rules (e.g., pertaining to CBRS). Such laws, regulations, and/or rules may be established by government(s) and/or standards bodies (e.g., Wireless Innovation Forum or WInnForum). Optionally, a GAA CBSD shall be able to transmit when incumbent user(s) and geographic region(s) to be maintained interference free are free of interference when the GAA CBSD transmits.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

Figure 1A:
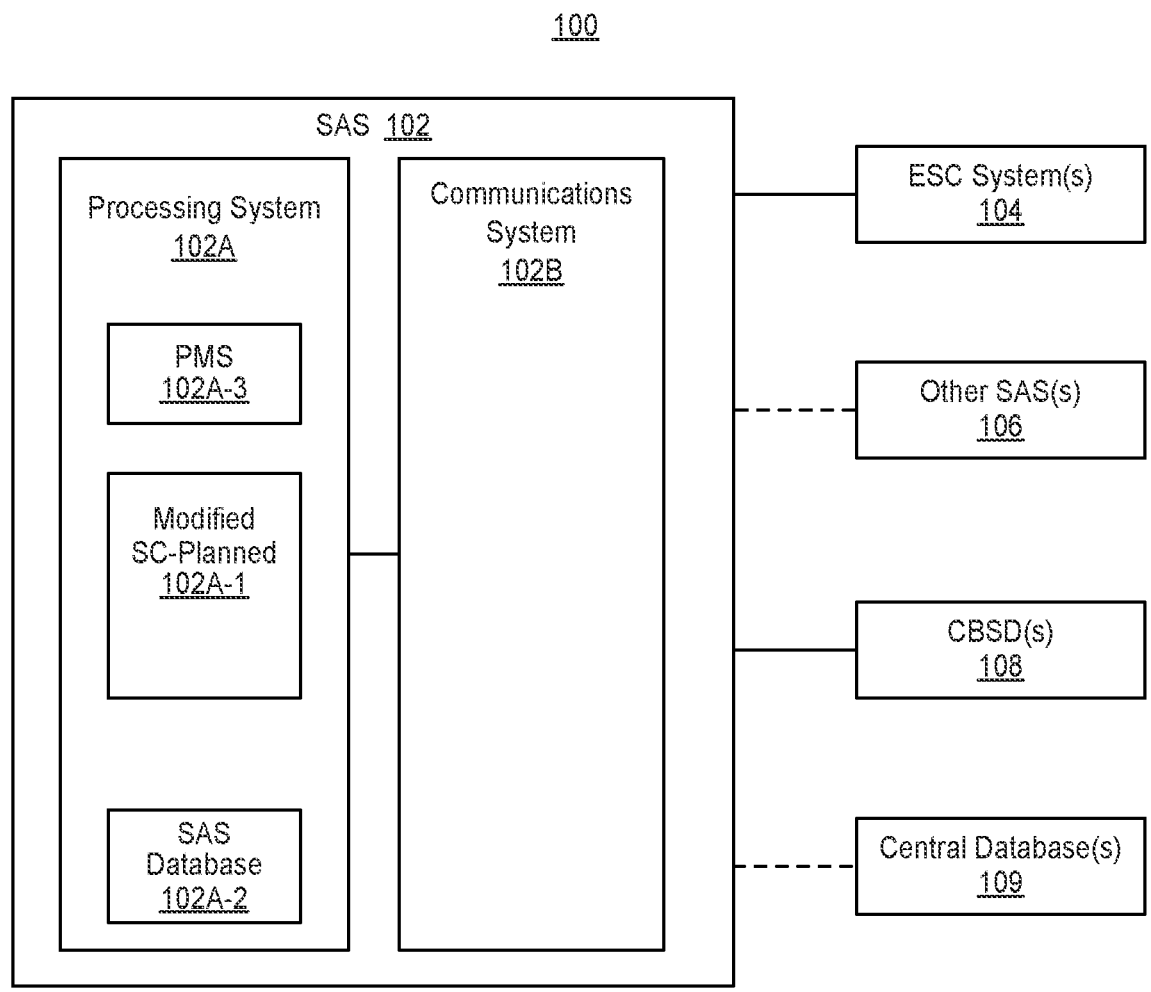
FIG. 1A illustrates a block diagram of one embodiment of a shared spectrum system configured to perform spectrum allocation at a planned time using a modified spectrum coordination system.

FIG. 1A illustrates a block diagram of one embodiment of a shared spectrum system 100 configured to perform spectrum allocation at a planned time using a modified spectrum coordination system. The planned time is when planned spectrum coordination is performed, and may be periodic or aperiodic. The shared spectrum system 100 comprises a SAS configured to permit radios access to share spectrum prior to a planned time (SAS) 102 and communicatively coupled to at least one CBSD (CBSD(s)) 108 whose transmissions are controlled or regulated by the SAS 102. Each CBSD is operated by a general authorized access user and/or a priority access licensee.

Optionally, the SAS 102 is coupled to at least one environmental sensing capability system (ESC system(s)) 104. Optionally, the SAS 102 is coupled to at least one central database (central database(s)) 109, e.g., which has information about (a) incumbent user(s) and/or (b) geographic region(s) to be maintained interference free (e.g., type, interference threshold power level, location, information about neighborhood, and/or when certain incumbent user(s) and/or geographic regions(s) to be maintained interference free are scheduled to receive in the shared spectrum or to include a communications system, e.g., a radar, that will receive in the shared spectrum.

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and where the other CBSD(s) are geographically proximate to the CBSD(s) 108. For example, such other CBSDs controlled by other SAS(s) 106 may include PAL and GAA users.

The SAS 102 is configured to perform interference analysis and authorize transmission by CBSD(s) 108 in the shared spectrum. CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. Alternatively, the shared spectrum system 100 and its PALs and GAA CBSDs, may generate electromagnetic energy that overlaps the geographic region(s) comprising CBSD(s) whose transmissions are controlled by the other SAS(s) 106, and thus must be accounted for by the other SAS(s) 106 when the other SAS(s) 106 perform interference analysis, and authorize operation of CBSDs of PALs and GAA CBSDs (whose transmissions are controlled by the other SAS(s) 106). By coupling SASs whose CBSDs are geographically proximate to one another, each SAS can account for electromagnetic energy emitted from proximate CBSD(s) in those geographic region(s).

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the central database(s) 109 which may be coupled to the SAS 102.

The SAS 102 also is also configured to control the operation (e.g., power levels and frequencies of operation) of the GAA user(s) CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the central database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

The SAS 102, e.g., the processing system 102A, comprises a modified spectrum coordination system (SC-planned or modified SC-planned) 102A-1, and a SAS database 102A-2. The SC-planned 102A-1 is configured to more efficiently perform planned spectrum coordination, e.g., as exemplified by embodiments described herein. Optionally, the SAS 102 includes a power modelling system (PMS) 102A-3. Optionally, SC-planned 102A-1 is implemented by software stored in the memory circuitry and executed by the processor circuitry, and the SAS database 102A-2 comprises data stored in the memory circuitry and processed by the processor circuitry. The components of the SAS 102 are provided for illustrative purposes only; other component(s) may be instead of those illustrated in FIG. 1A.

A conventional spectrum coordination system is configured to determine frequency spectrum to allocate to CBSD(s) (registered with a SAS 102 and/or other SAS(s) 106) that ensure that if the CBSD(s) request the frequency spectrum allocation recommended by the SAS 102 and/or the other SAS(s) 106, then the CBSD(s) will be free from interference. Conventional planned spectrum coordination system also determines the maximum transmission power of CBSDs so that protection point(s) (which represents actual and/or potential incumbent user(s) and/or regions which are to remain free of interference from CBSDs) will be free of interference. The conventional planned spectrum coordination system does so by assessing aggregate interference at each protection point having a neighborhood encompassing geographic location(s) of CBSD(s), where the aggregate interference is generated by such CBSD(s) in the neighborhood. Neighborhood means a geographic area (such as a circle or other shape) centered around a protection point, e.g., which optionally is defined by a radius or other geometric description.

Protection points may correspond to different types of incumbent users. An interference threshold level for a protection point may depend on a type of incumbent user that the protection point represents. Interference threshold levels may vary amongst incumbent user types.

Optionally, determination of maximum transmission power may be implemented with power allocation process that operates substantially accordingly to WInnForum general requirement R2-SGN-16 and using an iterative allocation process (IAP). WInnForum general requirement (requirement) R2-SGN-16 of WINNF-T S-0112 defines the IAP, and WINNF-T S-0112 is incorporated by reference herein in its entirety. The IAP determines maximum transmit power levels by allocating interference margin fairly to CBSDs in neighborhood(s) of protection point(s) proximate to the CBSDs. The IAP determines such transmit power levels by allocating interference margin fairly to the CBSDs in neighborhoods of protection point(s) of incumbent(s) for a certain combination or set of frequency spectrums mapped to the CBSDs. WInnForum general requirement (requirement) R2-SGN-16 of WINNF-TS-0112 defines the IAP and is incorporated by reference herein in its entirety. However, the power allocation system may be implemented in other ways to allocate, e.g., equitably, maximum transmission power of CBSDs.

However, as described elsewhere herein, the SC-planned 102A-1 differs from a conventional spectrum coordination system by utilizing at least one of the techniques described herein which makes planned spectrum coordination is more computationally efficient. The PMS 102A-3 is configured to model interference between two geographic points using at least one propagation model and may be used by the SC-planned 102A-1. However, in other embodiments, some or all of the functions provided by the PMS 102A-3 may be integrated into the SC-planned 102A-1. The propagation model(s) may be used to determine path loss between to geographic points; knowing a transmit power of a CBSD in the shared spectrum, the path loss may then be used to determine a power (transmitted from the CBSD) at a geographic location (e.g., at another CBSD or a protection point) remote from the CBSD. Optionally, the PMS 102A-3 includes two or more propagation models one of which may be selected based upon geographic morphology (e.g., topography) between two geographic points. The propagation model(s) may include a free space path loss model, an irregular terrain model and/or a Hata model (or variation(s) thereof such as the enhanced Hata (eHata) model). The PMS 102A-3 may be utilized by the SC-planned 102A-1 to determine interference power transmitted from a CBSD at a geographic location remote from the CBSD.

The SC-planned 102A-1 also includes techniques for generating a neighborhood around each protection point and can utilize the PMS 102A-3 to determine the aggregate level of interference, at each protection point, in frequency spectra at each protection point from CBSD(s) in the neighborhood of the protection point. To this end, the propagation model(s) (e.g., free space path loss model, irregular terrain model and/or Hata model (or variations thereof such as the enhanced Hata (eHata) model)) are used to determine path loss between CBSDs and protection point(s).

The SAS database 102A-2 includes information about the CBSD(s) 108 and CBSDs (geographically proximate to the CBSD(s) 108) whose transmissions in some or all of the shared spectrum are controlled by other SAS(s) 106. Optionally, such CBSD information may include CBSD type (and thus maximum transmit power) and/or maximum transmit power, geographic location, antenna height, antenna gain, antenna pattern, antenna down tilt angle, and/or antenna azimuthal angle. The SAS database 102A-2 also includes information about the location, e.g., representative protection point(s), of incumbent users proximate to the CBSD(s) 108. Additionally, and/or alternatively, the SAS 102 may remotely obtain such information, e.g., form the central database(s) 109, the other SAS(s) 106 (e.g., from a full activity dump (FAD) from each of the other SAS(s) 106 to the SAS 102), and/or the corresponding CBSD(s). The SAS database 102A-2 also includes network graph(s) generated by execution of the SC-planned 102A-1. Each network graph comprises one or more nodes, where each node comprises one or more GAA CBSDs, each node is assigned a color, where if the network graph comprises more than one node then each node is connected to at least one other node by an edge, and where two nodes connected with an edge do not have the same color. The SAS database 102A-2 may also include frequency spectrum allocation information for each color of each node of a network graph generated by SC-planned 102A-1. Optionally, the SAS database 102A-2 may include geographic morphology data about the geographic region where CBSDs whose transmission is controlled by the SAS 102 and optionally by other SAS(s) 106.

Figure 1B:
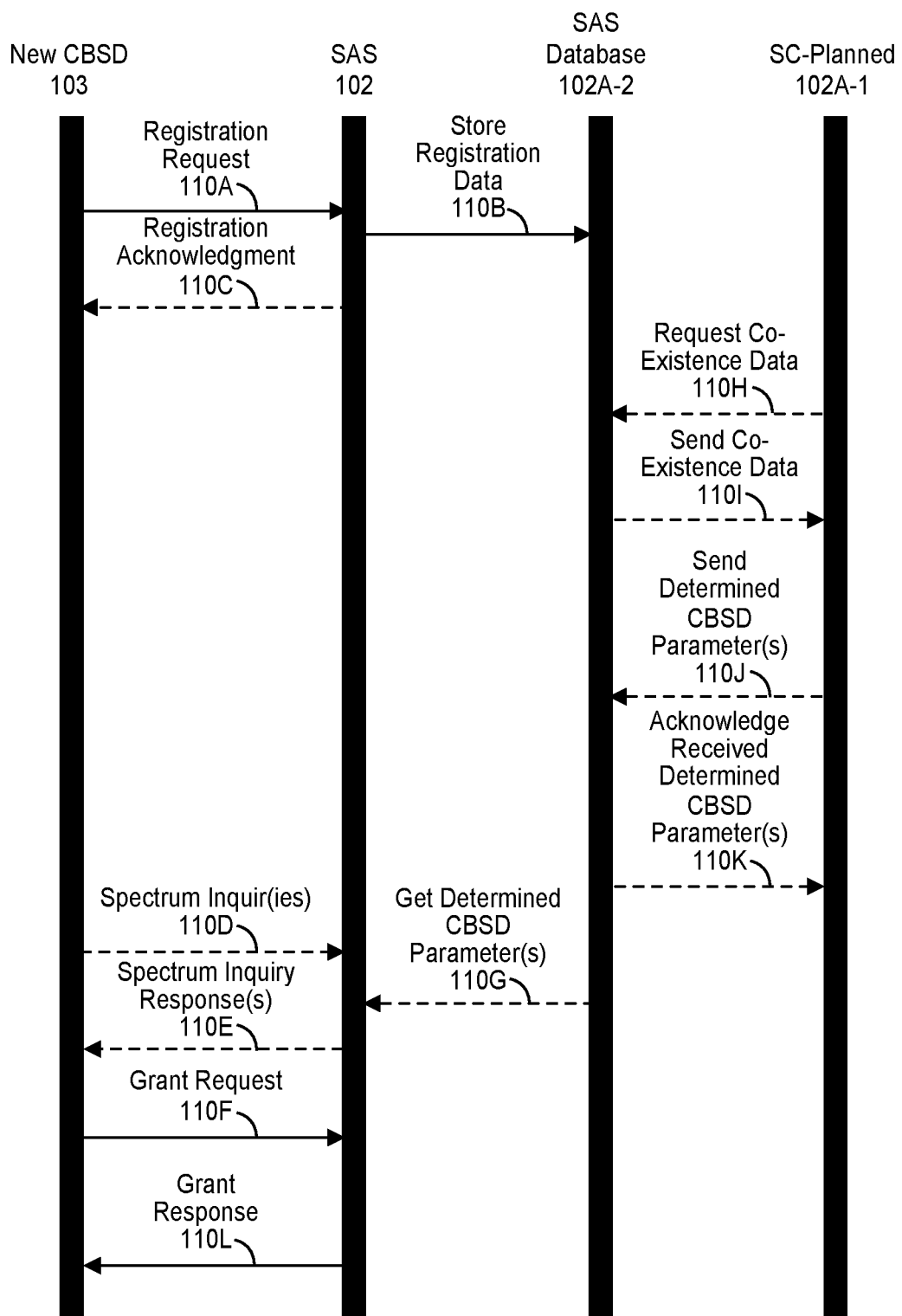
FIG. 1B illustrates a diagram of one embodiment of data flow between a citizens broadband radio service device and a spectrum access system comprising a modified spectrum coordination system.

FIG. 1B illustrates a diagram of one embodiment of data flow between a CBSD and a SAS comprising a modified spectrum coordination system. To the extent that data flow and methods shown in any of the Figures is described herein as being implemented in the system shown in FIG. 1A, it is to be understood that other embodiments can be implemented in other ways. Arrows in the data flow and blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Until it is registered with the SAS 102, transmissions of any unregistered CBSD are not controlled by the SAS 102. For purposes of clarity, even after a CBSD registers with the SAS 102, the CBSD will not be deemed to be a node of the network graph until a new network graph is generated by a next execution of SC-planned 102A-1 after registration.

To be become one of the CBSD(s) 108 (and thus to be considered by the SAS 102 to be allowed to transmit in the shared spectrum), the new CBSD 103 sends a registration request 110A to the SAS 102. Optional, communications between CBSDs, e.g., the new CBSD 103, and the SAS 102 may be made through, at least in part, the Internet. When sending the registration request, the new CBSD 103 is unregistered with the SAS 102. Optionally, the new CBSD 103 provides data (or registration data) about the new CBSD 103 in the registration request that upon its receipt by the SAS 102 is stored in the SAS database 102A-2. The SAS database 102A-2 also stores similar data for other CBSD(s) of the CBSD(s) 108, and optionally for CBSD(s) controlled by other SAS(s) 106 (which may be obtained for example from a full activity dump(s) from the other SAS(s) 106).

The data about the new CBSD 103 (CBSD type (and thus maximum transmit power), geographic location, CBSD group information, antenna height, antenna gain, antenna pattern, antenna down tilt angle, and/or antenna azimuthal angle). Optionally, the data may include a new CBSD's maximum transmit power in lieu of the new CBSD's CBSD type, e.g., category A or B. Optionally, the data may include the new CBSD's minimum acceptable transmit power (or minimum transmit power); if the new CBSD were to operate at less than it minimum acceptable transmit power, then for example its coverage area would be impractically small, or it would be unable to communicate with another fixed wireless access CBSD. Upon receipt of this data, and subject to there not being erroneous data provided to the SAS 102 or the new CBSD 103 not being a CBSD that should be controlled by the SAS 102, the new CBSD 103 becomes part of the CBSD(s) 108 whose transmissions in shared spectrum are controlled by the SAS 102.

Upon receiving the registration request 110A from a new CBSD 103, the SAS 102 stores the registration data 110B in the SAS database 102A-2, and optionally sends a registration acknowledgement 110C to the new CBSD 103. Optionally, the new CBSD 103 (or another CBSD of the CBSD(s) 108) sends at least one spectrum inquiry 110D to the SAS 102 each of which seeks to ascertain from the SAS 102 whether the SAS 102 would allocate to the new CBSD for transmission a frequency spectrum, in the shared spectrum, specified in a corresponding spectrum inquiry. Optionally, the SAS 102 sends to the inquiring CBSD a spectrum inquiry response 110E for each received spectrum inquiry. For example, if a spectrum inquiry response is received by the new CBSD, the spectrum inquiry response indicates that the frequency spectrum identified in the corresponding spectrum inquiry is available for transmission. Optionally, the spectrum inquiry response includes a maximum transmit power which can be used by the new CBSD to transmit in such frequency spectrum.

During planned spectrum coordination, SC-planned 102A-1 attempts to determine frequency spectrum and transmit power allocation for all registered CBSDs. The new CBSD 103 (or another one of the CBSD(s) 108) sends a grant request 110F to the SAS 102. The grant request specifies at least an identifier for the requesting CBSD and a frequency spectrum, in which the CBSD seeks authorization from the SAS 102 to transmit. Thus, the SAS 102 seeks to have the SC-planned 102A-1 determine whether the requesting CBSD can transmit in the requested frequency spectrum by attempting to determine CBSD parameter(s) 110G. For purposes of clarity, not every CBSD is guaranteed of receiving permission to transmit in requested frequency spectrum in the shared spectrum at a planned time, e.g., when SC-planned planned 102A-la is executed. The requesting CBSD may not be authorized by the SAS to transmit in the frequency spectrum specified in the grant request because the requested frequency spectrum is unavailable (e.g., because transmission in such frequency spectrum would result in excessive interference) and/or a determined maximum transmit power is less than a minimum acceptable transmit power level for the new CBSD 103; optionally, in such case, the SAS 102 may suggest an alternative frequency spectrum, determined during planned spectrum coordination, in the grant response or inquiry response parameter(s). Note, the SC-planned 102A-1 may also be attempting to determine whether one or more other GAA CBSD(s) (controlled by the SAS 102 and/or by other SAS(s) 106) can transmit in the shared spectrum.

When a CBSD, registered prior to a previously performed planned spectrum coordination, requests frequency spectrum from the SAS 102, the SAS 102 sends, to the CBSD, a frequency spectrum and maximum transmit power determined during the previously performed planned spectrum coordination. The CBSD may request frequency spectrum in a spectrum inquiry or a grant request. The frequency spectrum and maximum transmit power may be provided in a spectrum inquiry response 110E or a grant response 110L.

Optionally, the SC-planned 102A-1 requests co-existence data 110H from the SAS database 102A-2. Optionally, the SAS database 102A-2 sends the co-existence data 110I to the SC-planned 102A-1.

Upon receipt of the co-existence data, the SC-planned 102A-1 may, if possible, determine CBSD parameter(s) (as is further exemplified herein). The SC-planned 102A-1 will determine a frequency spectrum allocation and optionally determine a maximum transmit power for registered CBSD(s), that may, or may not, be below a minimum useable transmit power level. Minimum useable transmit power means a transmit power of a CBSD that is provides a coverage area of a minimum range or radius. When the SC-planned 102A-1 determines the CBSD parameter(s), then optionally the SC-planned 102A-1 sends the determined CBSD parameter(s) 110I to the SAS database 102A-2. Optionally, the SAS database 102A-2 stores the determined CBSD parameters. Optionally, the SAS database 102A-2 sends an acknowledgement of receipt of the determined CBSD parameter(s) 110J to the SC-planned 102A-1b. Optionally, sometime after receipt of the registration request from the new CBSD 103, the SAS 102 sends a registration acknowledgement 110C to the new CBSD 103 to confirm that the new CBSD 103 has been registered with the SAS 102.

Figure 2A:
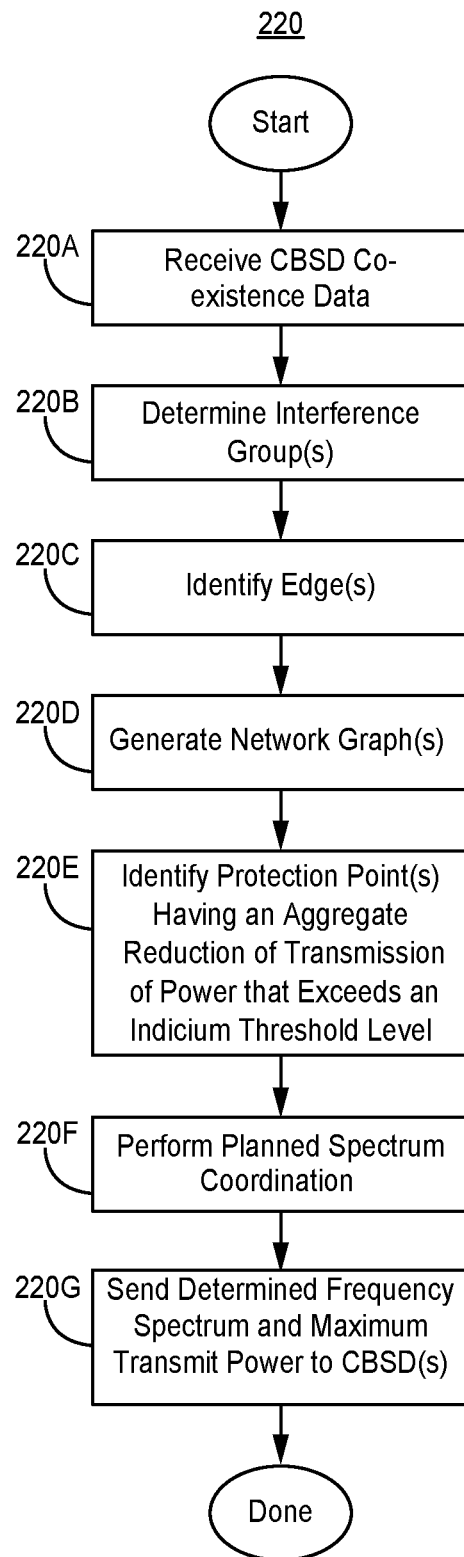
FIG. 2A illustrates a flow diagram of one embodiment of a method of determining, with enhanced computational efficiency, frequency spectrum and maximum transmit power to allocate, to a general authorized access citizens broadband radio service device during planned spectrum allocation.
Figure 2B:
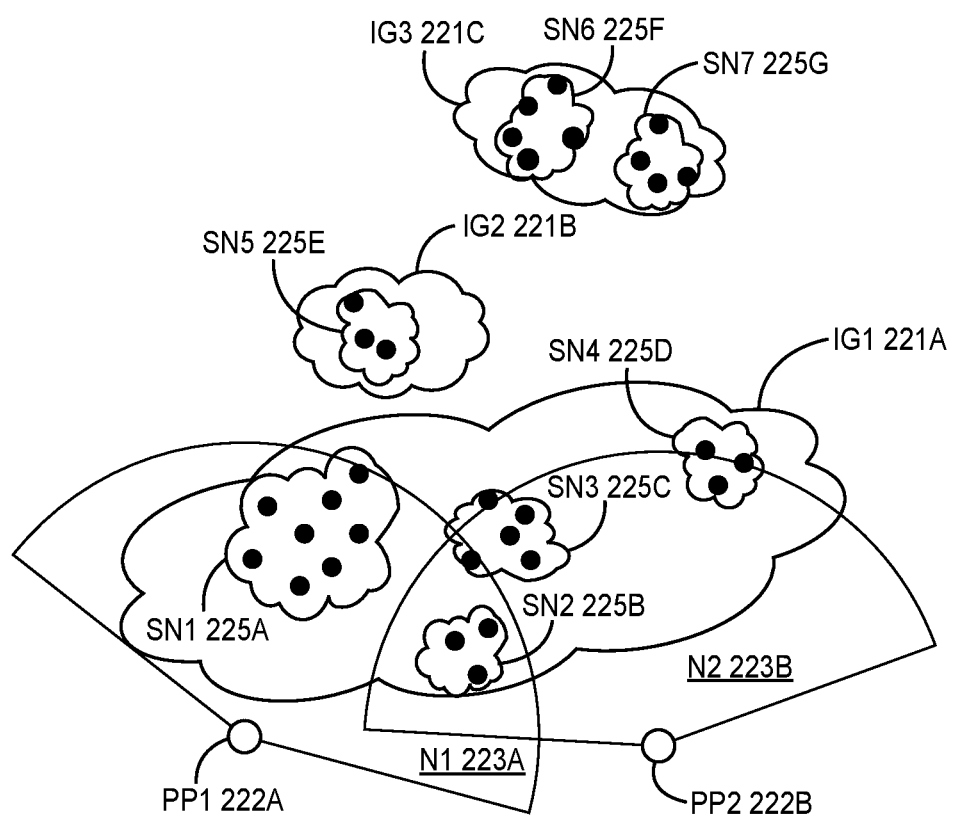
FIG. 2B illustrates a diagram of exemplary interference groups.

FIG. 2A illustrates a flow diagram of one embodiment of a method 220 of determining, with enhanced computational efficiency, frequency spectrum and maximum transmit power to allocate, to a GAA CBSD during planned spectrum allocation. This is accomplished by utilizing at least one of the techniques, described elsewhere herein, to enhance computational efficiency.

To the extent that the methods shown in any Figures are described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 220A, co-existence information (or data) is received. Co-existence data is described elsewhere herein. Such co-existence data information may be received from the SAS database, the central database(s), and/or other sources.

Optionally, in block 220B, at least one interference group is determined. If block 220B is performed, then block 220B may be performed before performing block 220C or after performing block 220D. Performing block 220B after block 220D may be done if a number of nodes of a set of nodes (or nodeset) is large, e.g., comprising at least one thousand nodes. Thus, if block 220B is performed before performing block 220C, then at least blocks 220C, 220D, 220F, and optional block 220E are performed on an interference group by interference group basis, e.g., in parallel as discussed elsewhere herein. Alternatively, if block 220B is performed after performing block 220D, then block 220F and optional block 220E are performed on an interference group by interference group basis. In either case, block 220G may or may not be performed on an interference group basis.

In block 220C, zero or more edges are identified, where an edge is formed between two nodes. An edge means that a criterion of interference at a GAA CBSD or a node consisting of one or more GAA CBSDs exceeds an edge interference threshold level. Optionally, the threshold level is an interference threshold level, and optionally the interference threshold level may be −96 dBm/10 MHz. An edge represents interference by one of the two CBSDs with the other CBSD, and possibly vice versa.

In block 220D, at least one network graph is generated. Optionally, if interference groups are determined, a network graph is generated for each interference group. The network graph comprises nodes. One or more sets of two nodes of the network graph may be connected by an edge. Each node comprises one or more GAA CBSDs operating in the same frequency spectrum of shared spectrum. The GAA CBSD(s) comprising nodes of the network graph may be controlled by the SAS 102 or the other SAS(s) 106 (i.e., peer SAS(s)). Each node is assigned a color. Each color, and thus each node, is assigned a frequency spectrum in the shared spectrum. Nodes of the same color are not necessarily allocated the same frequency spectrum, e.g., when a network graph comprises two or more separate connected sets; however, nodes of a connected set and having the same color are allocated the same frequency spectrum.

Optionally, in block 220E, zero or more protection points, each of which has an indicium of aggregate reduction of transmission power that exceeds an indicium threshold level, are identified, where a neighborhood of each protection point encompasses a geographic location of at least one GAA CBSD. Optionally, the at least one interference group comprises the at least one GAA CBSD. Optionally, if interference groups are determined, then this block is performed on an interference group by interference group basis.

In block 220F, planned spectrum coordination is performed. Optionally, if interference groups are determined, then this block is performed on an interference group by interference group basis. The planned spectrum coordination may be performed using conventional techniques such a heuristic technique described herein or more computationally efficiently using embodiments of the invention (as further described herein). The planned spectrum coordination determines which GAA CBSD(s) (which have requested to transmit in shared spectrum) are authorized to transmit in the shared spectrum, e.g., controlled by a SAS. A frequency spectrum (in the shared spectrum) and a maximum transmit power are determined for each such GAA CBSD determined to be authorized to transmit in the shared spectrum. Optionally, the determined frequency spectrum is a frequency spectrum requested by the GAA CBSD and approved, e.g., by the SAS (e.g., the SAS processing system); however, optionally in the alternative, e.g., the SAS (e.g., the SAS processing system) can determine the frequency spectrum without input from the corresponding GAA CBSD. After the frequency spectrum is determined, then the maximum transmit power of the GAA CBSD is determined using IAP, e.g., by the SAS (e.g., the SAS processing system). In block 220G, the determined frequency spectrum and maximum transmit power are sent to each GAA CBSD authorized (in block 220F) to be transmit in the shared spectrum. Optionally, the determined frequency spectrum is also sent to each GAA CBSD authorized (in block 220F) to be transmit in the shared spectrum. Optionally, if interference groups are determined, then this block is performed on an interference group by interference group basis.

Returning to FIG. 2B, where FIG. 2B illustrates a diagram of exemplary interference groups. FIG. 2B illustrates a first interference group (IG1) 221A, a second interference group (IG2) 221B, and a third interference group (IG3) 221C. Each such interference group 221A, 221B, 221C comprises at least one set of nodes. Each set of nodes comprise at least two nodes within the first distance. The second interference group 221B comprises a fifth set of nodes (SN5) 225E, and illustrates one embodiment of option (b) of the original definition of interference group. The third interference group comprises a sixth set of nodes (SN6) 225F and a seventh set of nodes (SN7) 225G, and illustrates one embodiment of option (b) of the optional definition of interference group. The first interference group (IG1) comprises a first set of nodes (SN1) 225A, a second set of nodes (SN2) 225B, a third set of nodes (SN3) 225C, and a fourth set of nodes (SN4) 225D, where each set of nodes is within at least one neighborhood of a first neighborhood (N1) 223A and a second neighborhood (N2) 223B respectively of a first protection point (PP1) 222A and a second protection point (PP2) 222B, and one set of nodes, SN2 is within both neighborhoods. The first interference group illustrates one embodiment of option (a) of the original definition of interference group.

Figure 2C:
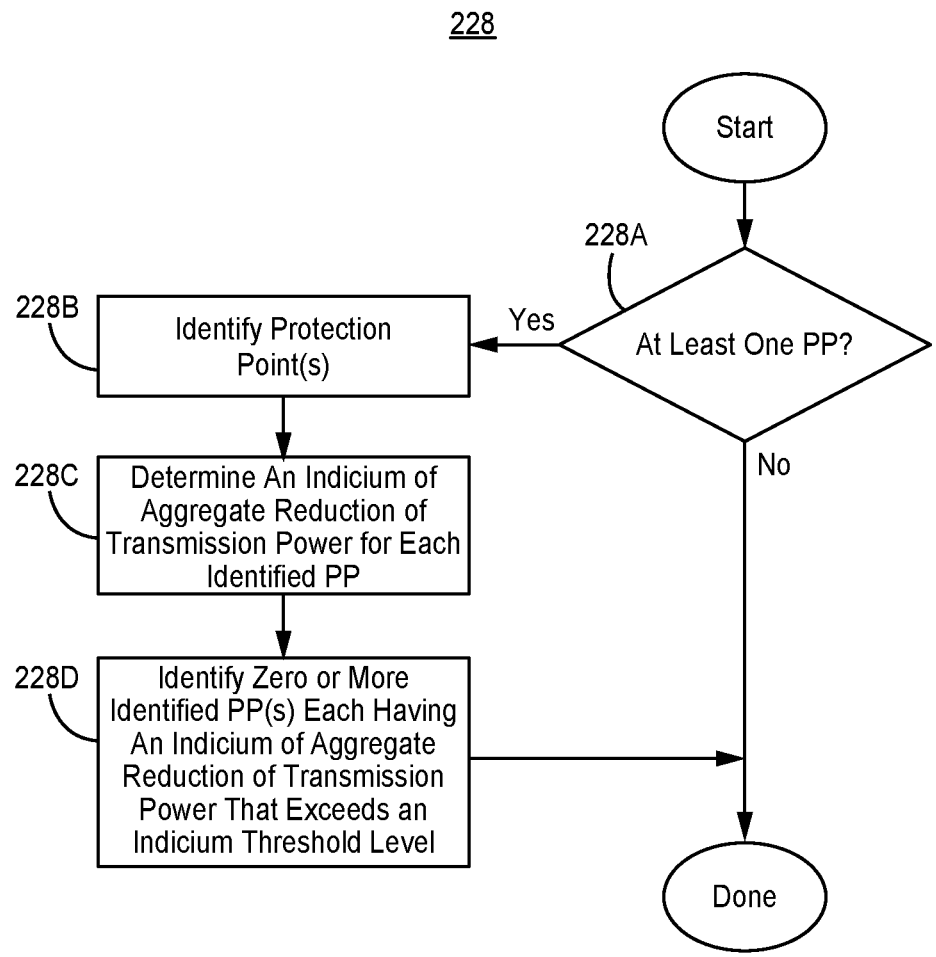
FIG. 2C illustrates a flow diagram of a method of seeking to diminish a number of protection point(s) utilized in planned spectrum coordination.

FIG. 2C illustrates a flow diagram of a method 228 of seeking to diminish a number of protection point(s) utilized in planned spectrum coordination, e.g., block 220E. In block 228A, whether a neighborhood of at least one protection point encompasses a geographic location of at least one GAA CBSD, of a node of a network graph (optionally of each interference group) is determined. If it is determined that there is no such protection point(s) for an interference group, then there is no need to diminish the number of such protection points.

If it is determined that there is at least one such protection point (optionally for an interference group), then, in block 228B, each protection point, whose neighborhood encompasses a geographic location of at least one GAA CBSD, of a node of a network graph (optionally of the interference group), is identified. In block 228C, an indicium of aggregate reduction of transmission power for each identified protection point (PP) is determined. This may be referred to as protection point sounding. Optionally, the indicium of aggregate reduction of transmission power may be an average transmit adjustment power (ATAP), an aggregate transmit adjustment power (AggTAP), and/or an average transmit adjustment power ratio (ATAP-R) used to characterize an aggregate reduction of transmission power of GAA CBSD(s) (comprising node(s) of a connected set) that are geographically located in a neighborhood of a protection point. ATAP and AggTAP may be used if all GAA CBSD(s) have the same maximum operating transmit power, e.g., are either category A or B. If the GAA CBSDs have different maximum operating transmit power levels, e.g., comprising category A and B, then ATAP-R must be used. However, even if all the GAA CBSD(s) have the same maximum operating transmit power, then ATAP-R may also be used.

Determination of ATAP and AggTAP will be first described. Firstly, a transmit adjustment power (TAP) is determined for each such GAA CBSD (comprising the node(s) of the connected set) geographically located in the neighborhood of the protection point. The transmit adjustment power of a GAA CBSD equals a maximum transmit power level of the CBSD less a transmit power level of the GAA CBSD to reduce aggregate interference at the protection point below a corresponding interference threshold level associated with the protection point (e.g., based on type of incumbent associated with the protection point, etc.). The maximum power of a CBSD may be directly or indirectly provided by the GAA CBSD when the GAA CBSD registers, e.g., with a SAS, or obtained from another source, e.g., the external database(s). The aggregate interference at the protection point is a sum of interference at the protection point from all GAA CBSD(s), transmitting on the same, or portions of, the frequency spectrum co-channel with a frequency spectrum associated with the corresponding identified protection point, and geographically located within the neighborhood of the protection point.

Secondly, an ATAP, AggTAP, and/or ATAP-R is determined for each protection point whose neighborhood encompasses geographic location(s) of GAA CBSD(s) comprising at least one node of the connected set. The AggTAP is determined by summing each TAP of all GAA CBSD(s) that co-channel with a frequency spectrum associated with the corresponding identified protection point, and are geographically located in the neighborhood of the protection point. The ATAP is determined by calculating the AggTAP and dividing by the number of GAA CBSDs whose TAPs were summed to determine the AggTAP.

Determination of ATAP-R will now be described. Firstly, a TAP is determined for each GAA CBSD as described above. Secondly, a transmit power adjustment ratio (TAP-R) is determined for each CBSD by dividing the TAP for each GAA CBSD by the maximum transmit operating transmit power of the corresponding GAA CBSD. Thirdly, ATAP-R is determined by averaging the TAP-R of each GAA CBSD. ATAP-R is used to characterize an aggregate reduction ratio of transmission power of GAA CBSD(s) (comprising node(s) of a connected set) that are geographically located in a neighborhood of a protection point. The following is an example of determination of ATAP-R for three GAA CBSDs: if the three GAA CBSDs have a maximum transmit power of 10W, 20W and 5W, and the transmit adjustment power is 2W, 3W and 2.5W, respectively, then the TAP-R is respectively 0.2, 0.15 and 0.5, and thus ATAP-R is 0.2833).

In block 228D, zero or more protection points, each of which have an indicium of aggregate reduction of transmission power (of GAA CBSD(s) geographically located within the neighborhood of the protection point) that exceeds an indicium threshold level, are identified. The indicium threshold level may vary based upon type of protection point. The determined indicium for each identified protection point then can optionally be used to diminish the number of protection points at which interference analysis is performed. Thus, by reducing the number of identified protection points analyzed by both optional techniques, computational efficiency can be enhanced. As is further explained elsewhere herein, optionally, the results of block 228D may be used to avoid performing, e.g., by a SAS, complex spectrum allocation analysis for each protection point whose neighborhood encompasses the geographical location of at least one GAA CBSD comprising a node of a network graph; thus, computational efficiency of performing planned spectrum coordination may be increased.

Figure 3:
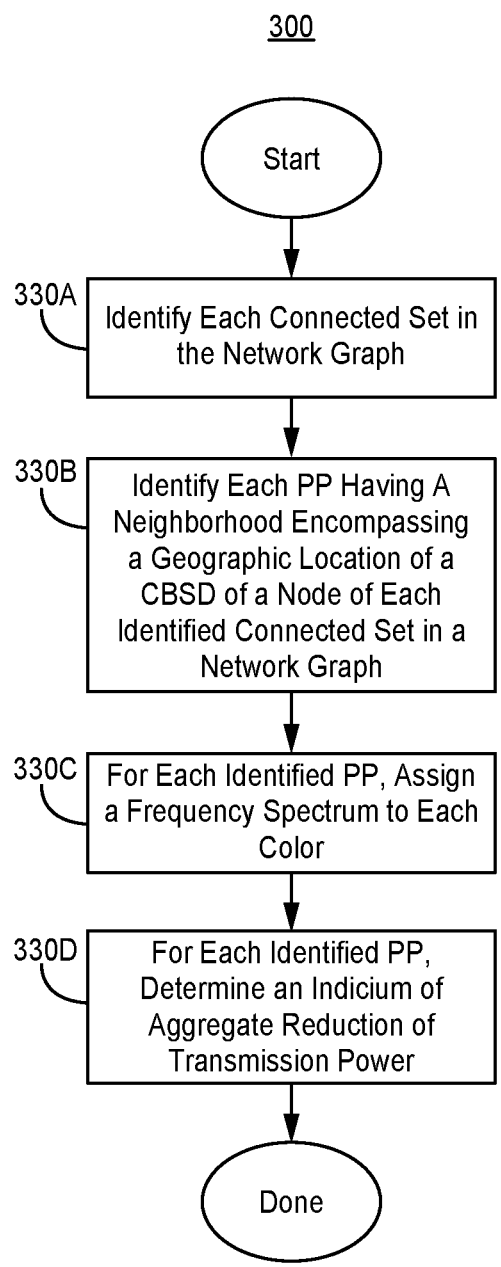
FIG. 3 illustrates a flow diagram of one embodiment of a method of determining an indicium of aggregate reduction of transmission power for each identified protection point.

FIG. 3 illustrates a flow diagram of one embodiment of a method 300 of determining an indicium of aggregate reduction of transmission power for each identified protection point, e.g., block 228D. Optionally, in block 330A, each connected set, in a corresponding network graph, is identified. Optionally, the network graph is a network graph of an interference group. Block 330A is optional because this block may have been previously performed with respect to the network graph.

In block 330B, each protection point, having a neighborhood encompassing a geographic location of a GAA CBSD of a node of each identified connected set, is identified. Optionally, this may be performed by searching for protection point(s), of a specific type, within a predefined distance, corresponding to the specific distance, of each GAA CBSD. Optionally, such a search may be performed for each type of protection point when specific distances vary by protection point type. Block 330B is optional because this block may have previously been performed.

In block 330C, for each identified protection point, a frequency spectrum is assigned to each color allocated to each node of the identified connected set, where each node comprises at least one GAA CBSD geographically located in a neighborhood of a corresponding identified protection point, where the frequency spectrum is co-channel with a frequency spectrum associated with the corresponding identified protection point, and where a frequency spectrum assigned to one color allocated to one node comprising an identified connected set is orthogonal to a frequency spectrum assigned to another color allocated to another node comprising the identified connected set, where orthogonal means that the frequency spectrums do not overlap, and where each assigned frequency spectrum is from a randomly selected set of frequency spectrum(s) which can be assigned to each node of the identified connected set. Optionally, block 330C may be performed for each identified protection point associated with the identified connected set as follows:
  (a) identify each GAA CBSD comprising a node of the identified connected set that are geographically located within a neighborhood of a corresponding identified protection point;
  (b) identify the nodes comprised of the identified GAA CBSD(s);
  (c) identify a color of each identified node; and
  (d) divide frequency spectrum associated with the identified protection point by the number of identified color(s), and randomly assigning (from a set of combinations of the unique portions of the divided frequency spectrum) a unique portion of the divided frequency spectrum to each identified color. The number of combinations equals a factorial of a chromatic number of the identified connected set. Because the combination is randomly selected, a worst case indicium of aggregate reduction of transmission power will not be determined in block 330D. However, the random selection should still identify which identified protection point(s) have aggregate interference above a threshold interference level due to GAA CBSD(s) geographically located in a neighborhood of each such protection point(s) and which are co-channel with a corresponding protection point.

Optionally, at least one of blocks 220C through 220G can be performed in parallel, using parallel processing, for each determined interference group.

In block 330D, for each identified protection point, an indicium of an aggregate reduction of transmission power (of GAA CBSD(s) geographically located in a neighborhood of the identified protection point) is determined. Optionally, the indicium of an aggregate reduction of transmission power is an ATAP, ATAP-R and/or an AggTAP for each identified protection point.

Figure 4A:
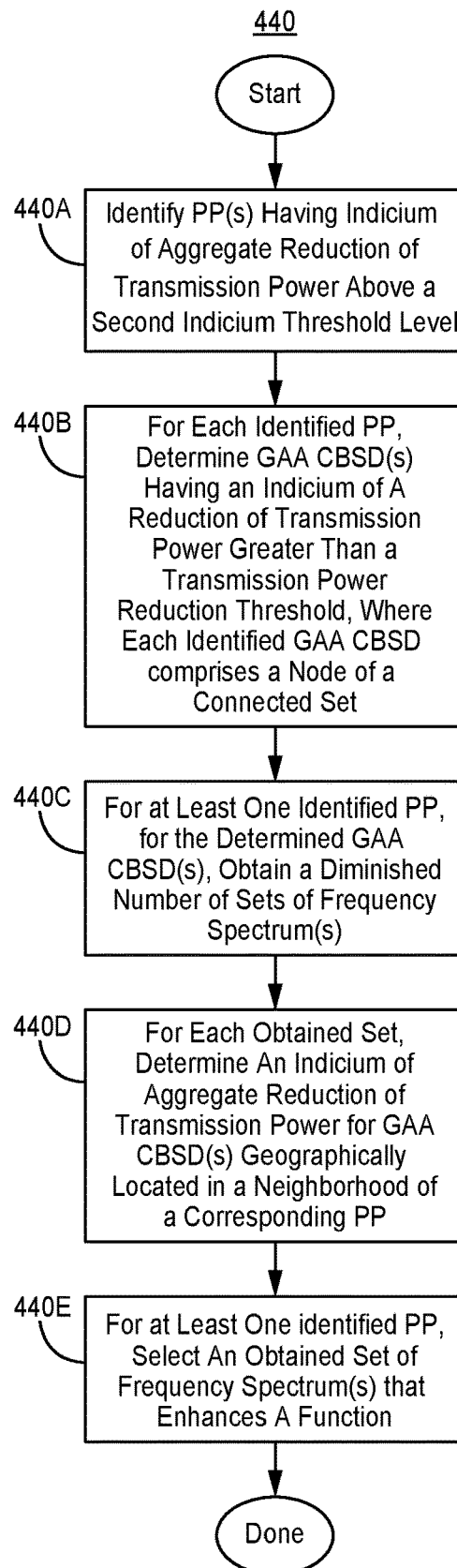
FIG. 4A illustrates a flow diagram of one embodiment of a method of performing planned spectrum coordination with enhanced computational efficiency.

FIG. 4A illustrates a flow diagram of one embodiment of a method 440 of performing planned spectrum coordination with enhanced computational efficiency, e.g., optionally determined in block 220F. The method 440 illustrates a technique for assigning frequency spectrum(s)—which have not previously been assigned to color(s)—to color(s) (not previously assigned frequency spectrum(s)), wherein the assigned frequency spectrum(s) enhance a product of bandwidth and maximum transmit power of GAA CBSD(s) of nodes allocated the color(s) assigned the frequency spectrum(s).

Figure 4B:
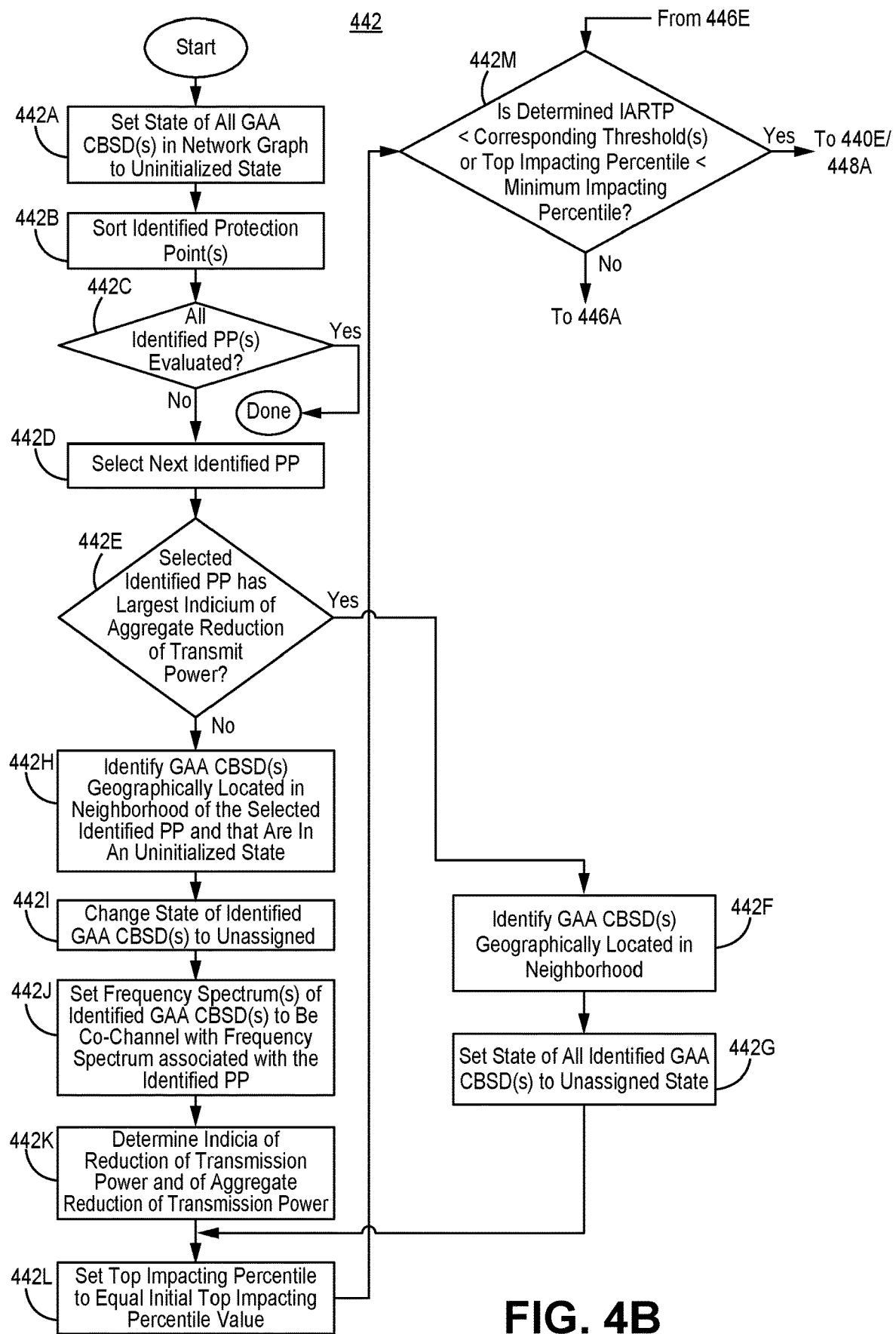
FIG. 4B illustrates a flow diagram of one embodiment of a method of determining protection point(s) having an indicium of aggregate reduction of transmission power above a second indicium threshold level.
Figure 5:
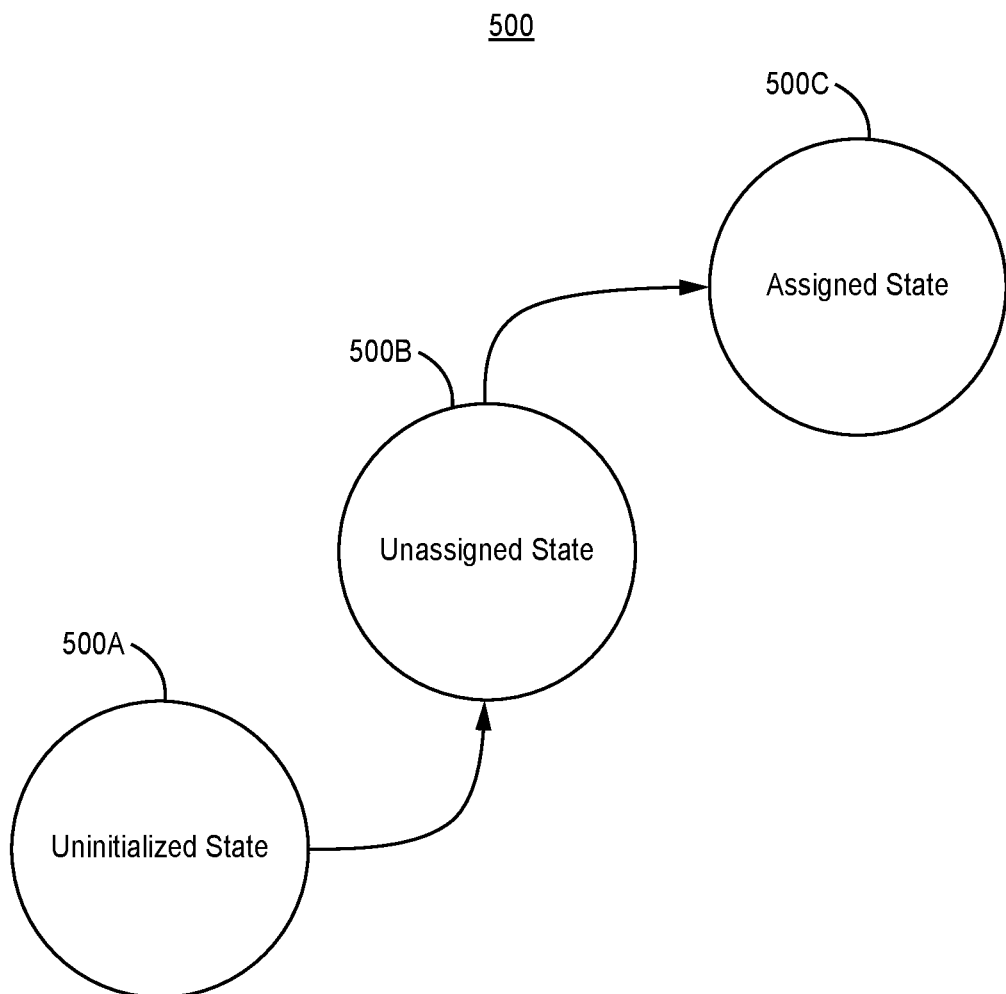
FIG. 5 illustrates a diagram of one embodiments of a set of states of a general authorized access citizens broadband radio service device.

In optional block 440A, protection point(s) (PP(s)) having an indicium of aggregate reduction of transmission power above a second indicium threshold level are identified. FIG. 4B illustrates a flow diagram of one embodiment of a method 442 of determining protection point(s) having an indicium of aggregate reduction of transmission power above a second indicium threshold level, e.g., optional block 440A. In block 442A, a state of all GAA CBSD(s) in a network graph for each connected set is set to an uninitialized state. FIG. 5 illustrates a diagram of one embodiments of a set of states 500 of a GAA CBSD. Initially and prior to performing planned spectrum coordination with enhanced computational efficiency, e.g., pursuant to FIG. 4A, each GAA CBSD has an uninitialized state 500A. GAA CBSD(s) whose geographic location is determined to be within a neighborhood of an identified protection point have their state set to an unassigned state 500B; thus, an unassigned state of a GAA CBSD means that the GAA CBSD is within a neighborhood of an identified protection point, but does not have an assigned state. An assigned state 500C of a GAA CBSD means that at least one potential frequency spectrum has been identified as being potentially assignable, or has been assigned, to a color allocated to a node comprising the GAA CBSD.

Selected protection point(s) or selected identified protection point(s) are used herein for pedagogical purposes with respect to FIGS. 4A-9. The term selected suggests that optional block 220E has been performed. However, block 220E is optional, and thus, where selected protection point(s) or selected identified protection point(s) are used, protection points or identified protection point(s) may also be used.

Returning to FIG. 4B, in block 442B, identified protection point(s) are sorted based upon a determined indicium of an aggregate reduction of transmission power of each identified protection point. The sorting may be in descending or ascending order. In block 442C, whether all identified protection points have been evaluated is determined. In block 442D, an identified protection point having the next largest indicium of aggregate reduction of transmission power is selected. The next selected identified protection point is an identified protection point having a largest indicium of an aggregate reduction of transmission power (in comparison with the previously selected identified protection point) if it is the first selected identified protection point; if the next selected identified protection point is not the first selected identified protection point, then an identified protection point having a next largest indicium of aggregate reduction of aggregate reduction of transmission power is selected. The next largest indicium of aggregate reduction of transmission power is a highest indicium of aggregate reduction of transmission power of an identified protection point of a subset of the sorted identified protection points that have not been selected. Thus, the corresponding identified protection point is an identified protection point in next sequence in the sorted list of identified protection points that has not been selected.

In block 442E, whether the selected identified protection point has a largest indicium of aggregate reduction of transmission power (e.g., a largest ATAP, a largest ATAP-R and/or a largest AggTAP) are determined. If the selected identified protection point does not have a largest indicium of aggregate reduction of transmission power, then proceed to block 442H.

If the selected identified protection point has a largest indicium of aggregate reduction of transmission power (e.g., ATAP, ATAP-R and/or a largest AggTAP), then in optional block 442F each GAA CBSD that is geographically located in a neighborhood of the selected identified protection point is identified. In block 442G, a state of all identified GAA CBSD(s) is set to an unassigned state. Block 442F is optional because identification of GAA CBSD(s) may have been previously performed, e.g., during protection point sounding or when identifying interference groups. Then, proceed to block 442L.

In block 442H, GAA CBSD(s), geographically located in a neighborhood of the selected identified protection point and that are in an uninitialized state, are identified. In block 442I, the state of the identified GAA CBSD(s) is changed to an unassigned state. GAA CBSD(s) in the unassigned state may include GAA CBSD(s), which are geographically located in neighborhood(s) of at least two identified protection point(s) and whose state(s) remain unassigned for previously analyzed identified protection point(s) having a higher indicium of aggregate reduction of transmission power.

In block 442J, each frequency spectrum of the identified GAA CBSD(s) is set to be co-channel with the frequency spectrum associated with the identified protection point. The frequency spectrum associated with the identified protection point is divided by the number of identified color(s) of node(s) comprising identified GAA CBSD(s); a unique portion of the divided frequency spectrum is randomly assigned (from a set of combinations of the unique portions of the divided frequency spectrum) to each identified color, and thus to each identified GAA CBSD. The number of combinations equals a factorial of a chromatic number of a connected set. Because the combination is randomly selected, a worst case indicium of aggregate reduction of transmission power will not be determined in block 442K. However, the random selection should still identify if the identified protection point has an aggregate interference above a threshold interference level due to GAA CBSD(s) geographically located in a neighborhood of each such protection point(s) and which are co-channel with a corresponding protection point. The resulting frequency spectrum determined for each identified CBSD in block 442J results in an initial set of frequency spectrum(s) assigned to node(s) of a determined connected set.

In block 442K, an indicium of reduction of transmission power for each GAA CBSD identified in block 442H and an indicium of aggregate reduction of transmission power (e.g., either (a) a TAP for each GAA CBSD identified in block 442H, and an ATAP, and/or an AggTAP, or (b) a TAP-R for each GAA CBSD identified in block 442H and an ATAP-R) are determined from the identified GAA CBSD(s) for the settings (specified in block 442J). The purpose of block 442K is to determine whether or not to assign frequency spectrum (that is co-channel with a frequency spectrum associated with the selected identified protection point) to the identified GAA CBSD(s) based on the indicium of aggregate reduction of transmission power.

In block 442L, a top impacting percentile is set to equal an initial top impacting percentile, e.g., an initial top impacting percentile of fifty percent. Top impacting percentile means a percentile of the determined TAP or TAP-R of the identified GAACBSD(s) that have the largest respectively TAP or TAP-R. The initial top impacting percentile will be greater than subsequently determined top impacting percentile(s). The initial top impacting percentile may be determined by a system designer and/or a system user.

In block 442M, for at least one set of frequency spectrum(s) (determined for the initial set of frequency spectrum(s) determined in block 442J when block 442M is first analyzed, or alternatively for the at least one set of frequency spectrum(s) which may be optionally determined by a last execution of block 440C (e.g., block 446D) when block 442M is subsequently optionally analyzed), whether the determined indicium of aggregate reduction of transmit power (IARTP) (e.g. the determined ATAP and/or the determined AggTAP, or the determined ATAP-R) is less than corresponding power level reduction threshold(s), or whether a top impacting percentile is less than a minimum impacting percentile, is determined. Each power level reduction threshold is an average or aggregate power level reduction, or an average power level reduction ratio, that would be acceptable for the GAA CBSD(s) for which respectively the ATAP or AggTAP, or ATAP-R, is determined. The minimum impacting percentile, e.g., 10%, may be determined by a system designer and/or a system user.

Figure 4C:
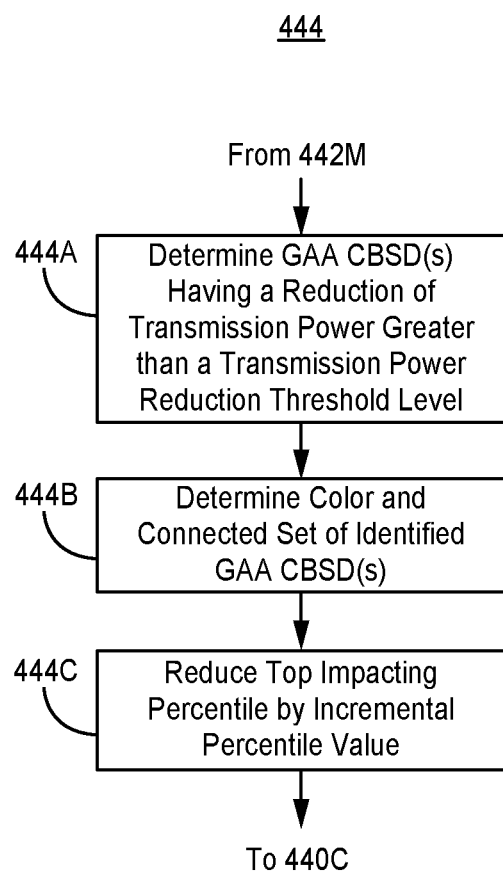
FIG. 4C illustrates a flow diagram of one embodiment of a method of determining, for each identified protection point, general authorized access citizens broadband radio service device(s), having an indicium of reduction of aggregate reduction of transmission power greater than a transmission power reduction threshold level.

If respectively the determined ATAP, the determined AggTAP, or determined ATAP-R, is less than the corresponding power level reduction threshold, or if the top impacting percentile is less than the minimum impacting percentile, then, proceed to block 440B. Returning to FIG. 4A, in block 440B, for each identified protection point, GAA CBSD(s), having an indicium of a reduction of transmission power greater than a transmission power reduction threshold level, are determined, where each identified GAA CBSD comprises a node of a connected set of a network graph. FIG. 4C illustrates a flow diagram of one embodiment of a method 444 of determining, for each identified protection point, GAA CBSD(s), having an indicium of reduction of transmission power greater than a transmission power reduction threshold level, e.g., block 440B.

In block 444A, CBSD(s), having an indicium of a reduction of transmission power, e.g., TAP or TAP-R, greater than a transmission power reduction threshold level, e.g., respectively a TAP threshold level or a TAP-R threshold level, are determined. In block 444B, each connected set(s) (comprising at least one node comprising at least one determined CBSD having a transmission power reduction threshold level greater than the transmission power reduction threshold level) and each color (allocated to a least one node comprising the determined GAA CBSD(s) having a transmission power reduction threshold level, e.g., a TAP or TAP-R, greater than the transmission power reduction threshold level, e.g., respectively a TAP threshold level or a TAP-R threshold level) of each such connected set are determined.

In block 444C, the top impacting percentile is reduced by an incremental percentile value, e.g., 10%. The incremental percentile value may be determined by a system designer and/or a system user.

Returning to FIG. 4A, in block 440C, for at least one identified protection point, for the determined CBSD(s), a diminished, e.g., a minimum, number of sets of frequency spectrum(s) is determined or obtained. By diminishing the number of set(s) of frequency spectrum(s), the number of interference analyses, in 440D, for the determined frequency spectrum(s) is reduced, thus improving computational efficiency. Block 440C may be implemented by at least one set of frequency spectrum(s) for at least one determined connected set being obtained—if available, where a unique frequency spectrum element of each set may be optionally allocated to each determined color of each determined connected set; each frequency spectrum element of the at least one set may or may not be a final assignment to a corresponding determined color. A set of at least one frequency spectrum means frequency spectrum assignable to each identified color (assigned to a node) of each identified connected set, where such frequency spectrum(s) are orthogonal with one another; for purposes of clarity the identified colors may be assigned to nodes of one or more identified connected sets. Each frequency spectrum element of each set of frequency spectrum(s) consists of a portion of a segment of frequency spectrum in which each GAA CBSD may be authorized (e.g., by a SAS) to transmit; such frequency spectrum in which each GAA CBSD may be authorized to transmit may be contiguous with or include shared spectrum. In block 440C, such frequency spectrum may not be obtained because it is unavailable, e.g., because there is insufficient bandwidth in frequency spectra available to the identified connected set. The aforementioned technique of block 440C seeks to reduce, e.g., minimize, the size of the at least one set of frequency spectrum(s) to diminish the computational effort performed in block 440E.

Figure 4D:
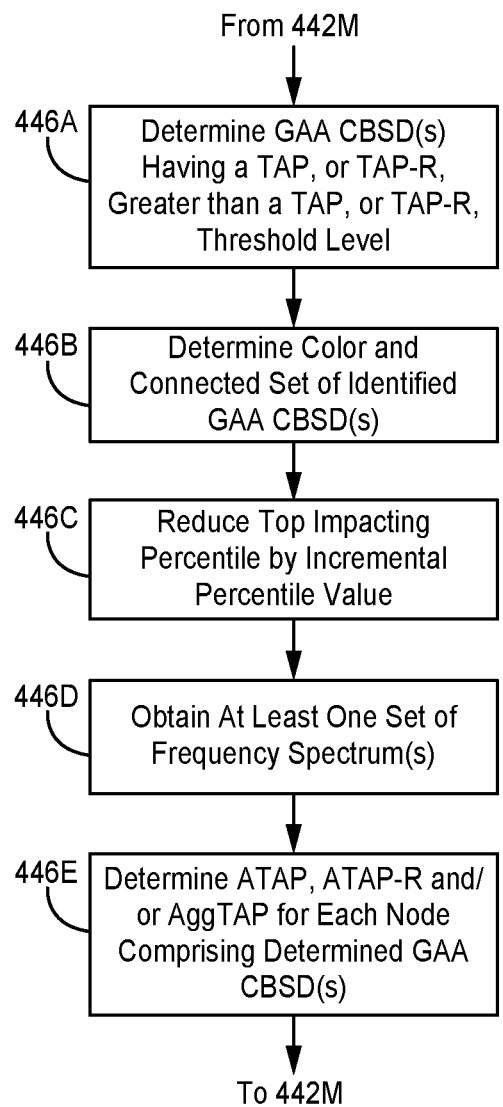
FIG. 4D illustrates a flow diagram of one embodiment of a method of determining or obtaining for at least one identified protection point, for the determined general authorized access citizens broadband radio service device(s), a diminished number of sets of frequency spectrum(s)

FIG. 4D illustrates a flow diagram of one embodiment of a method 446 of determining or obtaining for at least one identified protection point, for the determined GAA CBSD(s), a diminished, e.g., a minimum, number of sets of frequency spectrum(s), e.g., block 440C. In block 446A, GAA CBSD(s), having a TAP, or TAP-R, greater than respectively a TAP, or TAP-R, threshold level, are determined; top impacting CBSD(s) means the GAA CBSD(s) having a TAP, or TAP-R, greater than respectively the TAP, or TAP-R, threshold level. In block 446B, each connected set (comprising at least one node comprising at least one determined GAA CBSD having a TAP or TAP-R greater than respectively a TAP or TAP-R threshold level) and each color (allocated to a least one node comprising the determined GAA CBSD(s) having a TAP or TAP-R greater than respectively the TAP or TAP-R threshold level) of each such connected set are determined. In block 446C, the top impacting percentile is reduced by an incremental percentile value, e.g., 10%. The incremental percentile value may be determined by a system designer and/or a system user. Optionally, each time the requirements of block 442M are not satisfied, this block 446C will be performed, thus further reducing the top impacting percentile and include more GAA CBSDs geographically located within a neighborhood of an identified protection point.

In block 446D, at least one set of frequency spectrum(s) for at least one determined connected set is obtained—if available, where a unique frequency spectrum element of each set may be optionally allocated to each determined color of each determined connected set; each frequency spectrum element of the at least one set may or may not be a final assignment to a corresponding determined color. A set of at least one frequency spectrum means frequency spectrum assignable to each identified color (assigned to a node) of each identified connected set, where such frequency spectrum(s) are orthogonal with one another; for purposes of clarity the identified colors may be assigned to nodes of one or more identified connected sets. Each frequency spectrum element of each set of frequency spectrum(s) consists of a portion of a segment of frequency spectrum in which each GAA CBSD may be authorized (e.g., by a SAS) to transmit; such frequency spectrum in which each CBSD may be authorized to transmit may be contiguous with or include shared spectrum. In block 446D, such frequency spectrum may not be obtained because it is unavailable, e.g., because there is insufficient bandwidth in frequency spectra available to the identified connected set. The aforementioned technique of block 446D seeks to reduce, e.g., minimize, the size of the at least one set of frequency spectrum(s) to diminish the computational effort performed in block 446E.

In block 446E, for each of the at least one set obtained in block 446D, an ATAP and/or an AggTAP, or an ATAP-R, is determined for each node comprising determined CBSD(s). Whether ATAP and/or AggTAP, or ATAP-R, is utilized in Block 446E is based upon which of these parameters was analyzed previously, e.g., in block 442M.

Returning to FIG. 4A, in block 440D, for each of the at least one set obtained in block 440C, an indicium of aggregate reduction of transmission power (e.g., an ATAP and/or an AggTAP, or an ATAP-R), is determined for GAA CBSD(s) that are geographically located in a neighborhood of a corresponding identified protection point. Whether ATAP and/or AggTAP, or ATAP-R, is utilized in block 440D is based upon which of these parameters was analyzed previously, e.g., in block 442M.

Figure 4E:
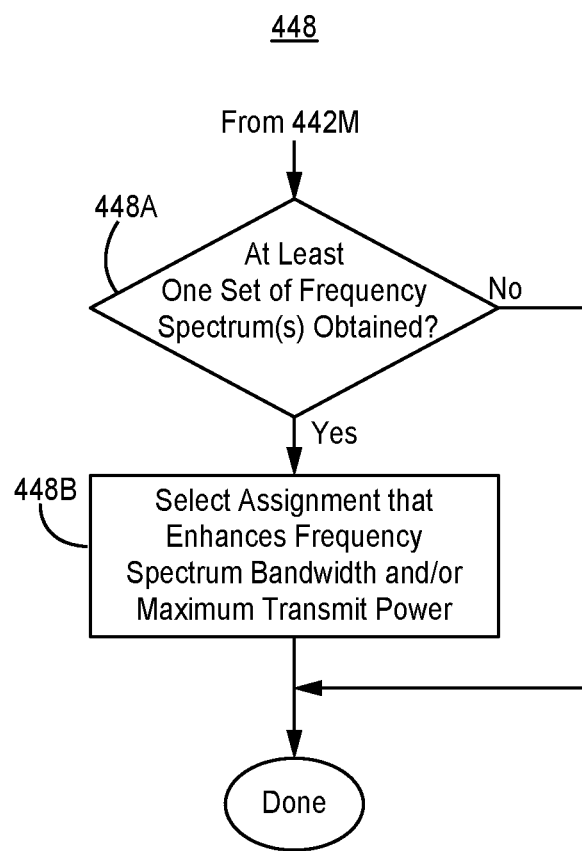
FIG. 4E illustrates a flow diagram of one embodiment of a method of determining an obtained set of frequency spectrum(s) that enhances a function of an indicium of an aggregate of a product of bandwidth and maximum transmit power.

In block 440E, for at least one identified protection point, an obtained set of frequency spectrum(s) that enhances, e.g., maximizes, a function of an indicium (of an aggregate of a product of bandwidth and maximum transmit power allocated to each GAA CBSD authorized to transmit in the shared spectrum and are geographically located in the neighborhood of the protection point) is determined. Optionally, block 440E is implemented by enhancing, e.g., maximizing, the indicium (of an aggregate of a product of bandwidth and maximum transmit power allocated to each GAA CBSD authorized to transmit in the shared spectrum and are geographically located in the neighborhood of the protection point). Optionally, block 440E is implemented as follows. FIG. 4E illustrates a flow diagram of one embodiment of a method 448 of determining an obtained set of frequency spectrum(s) that enhances a function of an indicium (of an aggregate of a product of bandwidth and maximum transmit power, e.g., block 440E.

Optionally, in block 442M, if the determined IARTP is less than the corresponding power level reduction threshold, or if the top impacting percentile is less than the minimum impacting percentile, then, in block 448A, whether at least one set of frequency spectrum(s) (determined for the initial set of frequency spectrum(s) determined in block 442J when block 442M is first analyzed, or alternatively for the at least one set of frequency spectrum(s) which may be optionally determined by a last execution of block 446D when block 442M is subsequently optionally analyzed) has been obtained is determined. If in block 448A at least one frequency spectrum was obtained, then, in block 448B, one set of frequency spectrum(s) (that has a large, e.g., maximum, indicium of an aggregate transmit power and bandwidth product allocated to the CBSDs authorized to transmit in the shared spectrum) is selected. The selection criterion is based on determining a frequency spectrum that results in a large, e.g., maximum, aggregate indicium of both aggregate transmit power and bandwidth of the CBSDs that are geographically located in the neighborhood of the protection point is selected from the at least one set of frequency spectrum(s); the selected set of frequency spectrum(s) is allocated to identified color(s) assigned to nodes of the selected identified connected set.

Figure 6A:
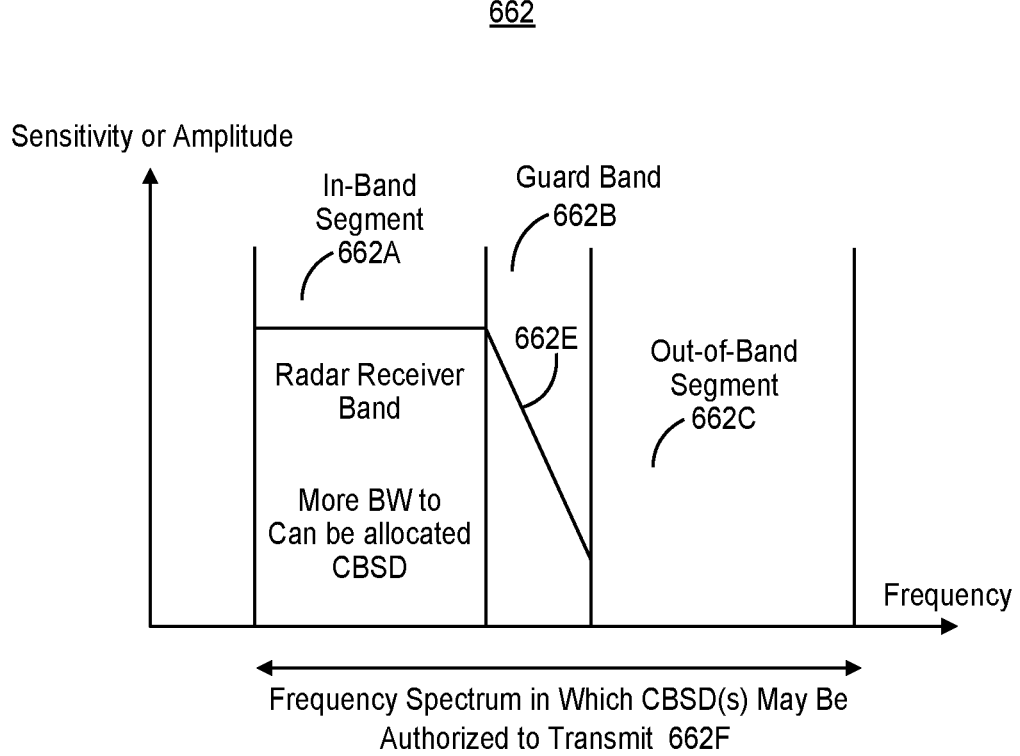
FIG. 6A illustrates a diagram of one embodiment of segments of frequency spectrum in which general authorized access citizens broadband radio service device(s) may be authorized to transmit.

FIG. 6A illustrates a diagram of one embodiment of segments of frequency spectrum 662 in which GAA CBSD(s) may be authorized to transmit. At a minimum, the frequency spectrum in which CBSD(s) may be authorized to transmit 662F consists of at least two segments: in-band (i.e., the frequency spectrum associated with a selected identified protection point) and out-of-band (i.e., frequency spectrum orthogonal to the frequency spectrum associated with a selected identified protection). However, the number of segments may be 2, 3, or more. The number of segments may be defined by a system designer, a system user, regulation, law, and/or a standard. More specifically, FIG. 6A illustrates a diagram comprising three segments of frequency spectrum in which GAA CBSD(s) may be authorized to transmit 662F. FIG. 6A illustrates an idealized bandpass characteristic 662E of a receiver of the ESC system. The idealized bandpass characteristic 662E comprises an in-band segment 662A, a guard band 662B, and an out-of-band segment 662C—which overlap frequency spectrum in which CBSD(s) may be authorized to transmit. The in-band segment 662A is contiguous with or includes at least the frequency spectrum in which the receiver seeks to detect signals. Signal transmissions by GAA CBSD(s) received in the in-band segment 662A and at the selected identified protection point contribute to aggregate interference at such protection point. Signal transmissions by GAA CBSD(s) received in the guard band segment 662B and at the selected identified protection point may indirectly contribute to aggregate interference at such protection point due to creating adjacent channel interference which can desensitize a receiver, e.g., of an ESC system, at such protection point. The guard band is frequency adjacent to the in-band and orthogonal to the frequency spectrum associated with a selected identified protection.

Optionally, the bandwidth of the guard band segment 662B may be less than the bandwidth of the in-band segment 662A. In such a case, a larger bandwidth can be allocated to CBSD assigned frequency spectrum comprising or within the in-band segment 662A than if the CBSD was frequency spectrum comprising or within the guard band segment 662B. However, a larger maximum transmit power can be allocated to a GAA CBSD assigned frequency spectrum comprising or within the guard band segment 662B than if the GAA CBSD was frequency spectrum comprising or within the in-band segment 662A.

Signal transmissions by CBSD(s) received in the out-of-band segment 662C and at the selected identified protection point do not contribute to aggregate interference at such protection point. Optionally, number of segments might increase, for example, if a second guard band and/or a second out-of-band segment overlap the frequency spectrum in which CBSD(s) may be authorized to transmit 662F at a lower frequency than the in-band segment 662A.

Figure 6B:
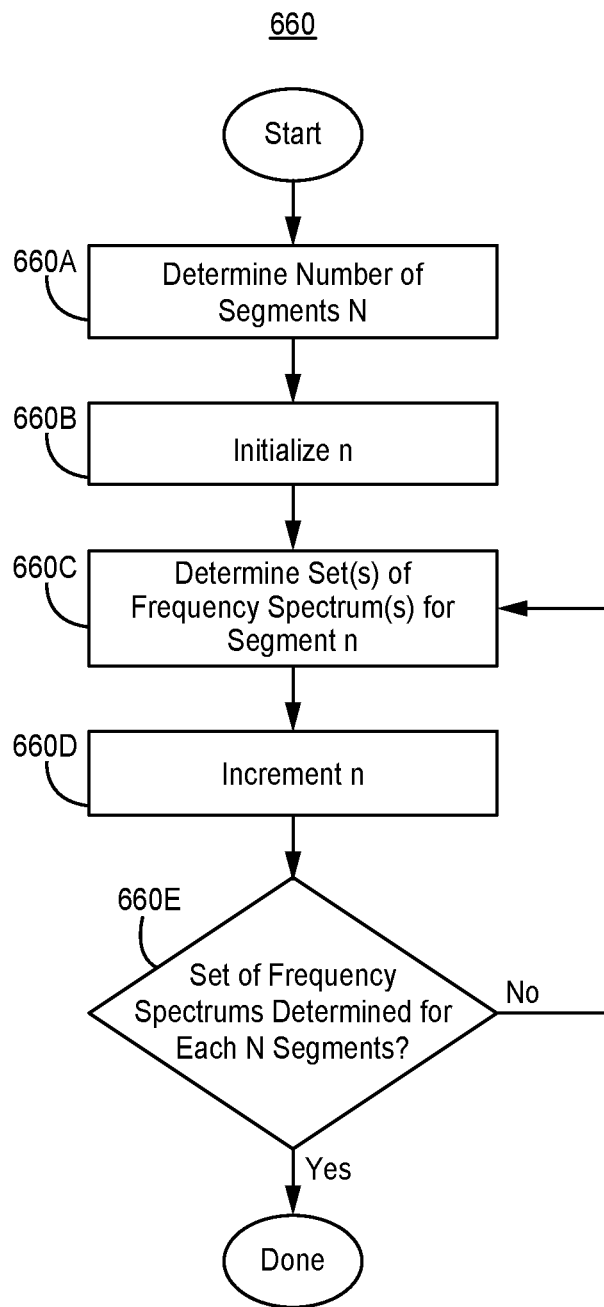
FIG. 6B illustrates a flow diagram of one embodiment of a method of obtaining at least one set of frequency spectrum(s) for at least one determined connected set—if available.

FIG. 6B illustrates a flow diagram of one embodiment of a method 660 of obtaining at least one set of frequency spectrum(s) for at least one determined connected set—if available, e.g., block 440C. In block 660A, a number of segments, N, in frequency spectrum, in which GAA CBSD(s) may be authorized to transmit, is determined. Optionally, the number of segments can be determined by a type of the selected identified protection point, type of incumbent user associated with the selected identified protection point, and/or an extent to which the in-band segment(s), the guard band segment(s), and/or the out-of-band segment(s) of the frequency spectrum associated with the selected identified protection point overlap frequency spectrum in which GAA CBSD(s) may be authorized to transmit. Optionally, each segment has an equal bandwidth.

In block 660B, variable n is initialized, e.g., set variable n to a number; the number is, e.g., an integer, for example, one. In block 660C, set(s) of frequency spectrum(s) for an nth segment is determined; it may not be possible to make this determination. In block 660D, variable n is incremented, e.g., by an integer, for example, one. In block 660E, whether a set of frequency spectrums has been determined for each N segments is determined, e.g., by determining if n is greater than N. If the set of frequency spectrums has not been determined for each N segments, then proceed to block 660C.

FIG. 7 illustrates a flow diagram of one embodiment of a method 770 of determining a set of frequency spectrums for an nth segment—if possible, e.g., block 660C. The illustrated technique seeks to diminish the number of set(s) of frequency spectrum(s). By doing so, computational requirements are diminished when determining an indicium of aggregate reduction of transmission power, e.g., in block 440D.

In block 770A, an indicium, of aggregate reduction of transmission power for a selected identified protection point based upon top impacting GAA CBSD(s) comprising at least one node(s) of each impacting connected set, is determined. The indicium of aggregate reduction of transmission power may be ATAP or AggTAP, or ATAP-R. Impacting connected set means an identified connected set comprising at least one node comprising at least one top impacting GAA CBSD. Thus, impacting connected set(s) may be identified after top impacting CBSD(s) are identified, e.g., in block 444A; an impacting connected set comprises at least one node comprising a top impacting CBSD.

In block 770B, a weighted indicium of aggregate reduction of transmission power for each impacting connected set is determined. The weight for an impacting connected set is a percentage of top impacting GAA CBSD(s) comprising node(s) of the impacting connected set with respect to a total number of GAA CBSD(s) comprising node(s) of the impacting connected set, i.e. all connected sets with at least one node geographically located in the neighborhood of the protection point. A weighted indicium of aggregate reduction of transmission power of each impacting connected set is determined by multiplying a weight of an impacting connected set by the determined indicium of aggregate reduction of transmission power of the impacting connected set. The weighted indicium of aggregate reduction of transmission power may be a weighted ATAP or AggTAP, or ATAP-R based upon whether the indicium of aggregate reduction of transmission power determined in block 770A is respectively ATAP or AggTAP, or ATAP-R.

In block 770C, the impacted connected set(s) are ranked by weighted indicium of aggregate reduction in transmission power, from largest to smallest or vice versa, and an anchor connected set is determined. An anchor connected set means an impacted connected set having a largest weighted indicium of aggregate reduction in transmission power; if there is more than one impacted connected set having the largest weighted indicium of aggregate reduction in transmission power, then one of the more than one impacted connected set having the largest weighted indicium of aggregate reduction in transmission power, is arbitrarily or randomly selected as the anchor connected set.

In block 770D, for each impacting connected set, impacting color(s) are determined. Impacting color(s) means color(s) of each node comprised of at least one top impacting GAA CBSD of an impacting connected set.

In block 770E, for each impacting connected set, frequency spectrum not previously assigned to a color of a node of the impacting connected set is determined. Such frequency spectrum is all or a portion of the nth segment of frequency spectrum. Thus, any node comprising a CBSD with an assigned state will not have a frequency spectrum determined for its' color.

In block 770F, variable m is initialized, e.g., set variable m to a number; the number is, e.g., an integer, for example, one. In block 770G, whether m is greater than M is determined. If m is greater than M, then proceed to block 770J. M is set to the number of identified impacting connected set(s). Therefore, blocks 770L to 770Q are applied for each identified impacting connected set.

If m is not greater than M, then, in block 770H, whether a frequency spectrum portion is available in the nth segment for the mth impacting connected set is determined. Some or all frequency spectrum portion may have already been assigned to color(s) of the mth impacting connected set when determining color(s) of node(s) for previously analyzed protection point(s), and hence are unavailable.

If a frequency spectrum portion is not available, then in block 770I, variable m is incremented, e.g., by an integer, for example, one, and return to block 770G. If a frequency spectrum portion is available, then, in block 770L, sets of frequency spectrum assigned to the impacting color(s) are determined for each impacting connected set, where each impacting color is assigned a frequency spectrum portion of equal bandwidth that is orthogonal to frequency spectrum portion(s) assigned to other impacting color(s) (if any), where the bandwidth of frequency spectrum portion assigned to each impacting color of an impacting connected set is equal to the frequency spectrum determined in block 770E divided by the number of impacting colors of the impacting connected set, and where the number of sets of frequency spectrum is a factorial of the number of impacting colors of an impacting connected set. In block 770M, for each impacting connected set, whether a bandwidth of each impacting color is less than a threshold bandwidth is determined. The threshold bandwidth may be defined by a system designer and/or system user. For each impacting connected set where all impacting colors do not have a bandwidth less than the threshold bandwidth, then proceed to block 770O.

For each impacting connected set where all impacting colors have a bandwidth less than the threshold bandwidth, then, in block 770N, set(s) of possible orthogonal frequency spectrum(s) are determined, where the number of frequency set(s) is based upon a factorial of the number of impacting colors of the corresponding impacting connected set, where each frequency spectrum assignable to a color has equal bandwidth, and where bandwidth is expanded using bandwidth from at least one other segment (other than the nth segment). The bandwidth expansion comprises determining a probability distribution of the impacting color(s) of the impacting connected set; the probability of each impacting color is determined by a ratio of a number of GAA CBSD(s) allocated to an impacting color with respect to a total number of GAA CBSD(s) comprising nodes of the impacting connected set. The impacting color(s) with a probability below a probability threshold are assigned frequency spectrum in the at least one other segment. Thus, the set(s) of frequency spectrum(s) determined in block 770L become combinations or sets of possible orthogonal frequency spectrum(s). Then, proceed to block 770O.

In block 770O, whether the mth impacting connected set is the anchor connected set is determined. If the mth impacting connected set is determined to be the anchor connected set, then proceed to block 770Q. If the mth impacting connected set is determined not to be the anchor connected set, then, in block 770P, the number of sets of possible orthogonal frequency spectrum(s) is reduced. The reduction is achieved by arbitrarily, e.g., randomly, eliminate one or more sets, e.g., all but 1 set of possible orthogonal frequency spectrum(s). Then, proceed to block 770Q.

In block 770Q, the determined set(s) of frequency spectrum(s) are appended to a list of set(s) of frequency spectrum(s). Such determined set(s) are determined in block 770L, and reduced in block 770P for determined set(s) for connected set(s) that are not anchor connected set(s). The list may comprise set(s) from more than one impacting connected set due to the appending. Note, the list may be empty if no set(s) of frequency spectrum(s) were previously appended to the list. Then, proceed to block 770I.

In block 770J, for each set in the list of set(s) of frequency spectrum(s), each CBSD, comprising all node(s) (of the impacted connected set) assigned an impacting color, is assigned a corresponding frequency spectrum of that impacting color designated in the set. For purposes of clarity, each impacting color, and thus node(s) and GAA CBSD(s) comprising each node, may be assigned different frequency spectrum for each set of frequency spectrums. Each set comprises a frequency spectrum allocatable to each color assigned to each node of the impacting connected set. In block 770K, state of identified GAA CBSD(s) is changed to an assigned state.

FIG. 8 illustrates a flow diagram of one embodiment of a method 880 for reducing a number of sets of possible orthogonal frequency spectrum(s), e.g., block 770P. In block 880A, an anchor ratio is determined. The anchor ratio is a ratio of a number of GAA CBSD(s) in the anchor connected set with respect to a number of GAA CBSD(s) in an impacting connected set having a second highest indicium of aggregate reduction of transmit power (following the indicium of aggregate reduction of transmit power of the anchor connected set).

In block 880B, whether the anchor ratio is greater than a threshold anchor ratio is determined. The threshold anchor ratio is determined by a system user and/or designer.

In block 880C, whether there are any dominant colors in the colors assigned to nodes of the selected identified connected set is determined. A dominant color is an impacting color where a ratio—of a number of GAA CBSD(s) comprising to node(s), of the selected identified connected set, assigned the impacting color with respect to the total number of CBSD(s) comprising nodes(s) of the selected identified connected set—is greater than a threshold ratio. The threshold ratio may be selected by a system designer and/or user.

In block 880D, a number of non-dominant colors is determined. The number of non-dominant colors equals the total number of colors assigned to nodes of the selected, identified connected set less a number of dominant colors.

In block 880E, a number of frequency spectrum portion(s) of the nth segment is determined, where one frequency spectrum portion has a beginning or end frequency that is coincident with respectively a beginning or end frequency of the nth segment. If in block 770N frequency sets of possible orthogonal frequencies were determined with bandwidth expansion, then a number of frequency spectrum portion(s) of the expanded nth segment bandwidth where one frequency spectrum portion has a beginning or end frequency that is coincident with respectively a beginning and/or end frequency of the expanded nth segment. In block 880F, only set(s) of frequency spectrum utilizing frequency spectrum of non-dominant color(s) are retained.

FIG. 9 illustrates a flow diagram of one embodiment of a method 990 of selecting one set of frequency spectrum(s)

(that has an enhanced, e.g., maximum, indicium of an aggregate of a product of bandwidth and maximum transmit power allocated to each GAA CBSD authorized to transmits in shared spectrum), e.g., block 448B. In block 990A, set(s) of frequency spectrum(s) are ranked based upon an indicium of power spectral density (PSD), e.g., a mean power spectral density or a median power spectral density, of GAA CBSD(s) geographically located within a neighborhood of a selected identified protection point. The ranking may be from largest MPSD to smallest MP SD, or vice versa. Optionally, the median power spectral density can be computed.

In block 990B, set(s) of frequency spectrum(s) are ranked based upon an indicium of power bandwidth product (PBP) or bandwidth (BW), e.g., mean or median power bandwidth product or bandwidth, of GAA CBSD(s) geographically located within a neighborhood of a selected identified protection point. Power bandwidth product (or bandwidth-maximum transmit power product) means a product of bandwidth and maximum transmit power (in power spectral density) allocatable to each such GAA CBSD; bandwidth in this context means a bandwidth of frequency spectrum assigned to each such GAA CBSD. The ranking of an indicium of PSB is in the same order (largest to smallest, or vice versa) as the ranking of an indicium of PBP or BW. Blocks 990A and 990B only need to be performed if rankings are used to determine an indicium of rank of each set of frequency spectrum(s) as described elsewhere herein.

In block 990C, an indicium of rank of each set of frequency spectrum(s), in the set(s) of frequency spectrum(s) (ranked or not ranked by an indicium of PSD), and the set(s) of frequency spectrum(s) (ranked or not ranked by an indicium of PSB), is determined. The indicium of ranking may be the rank of each set of frequency spectrum(s) in ranked frequency spectrum(s), a weighted value of an indicium of PSD or an indicium of PBP or BW, or another type of indicium of ranking. When descending order is used, the lowest order ranking has a largest value. When ascending order is used, the highest order ranking has the largest value. A weight of each set of frequency spectrum(s) in each set of rankings of indicia of PSD or an indicium of PBP or BW is determined by (1) summing respectively the indicia of PSD or the indicium of PBP or BW of each set of frequency spectrum(s), and (2) dividing the respective indicium of PSD or the indicium of PBP or BW of each frequency set of frequency spectrum(s) by the corresponding sum.

In block 990D, the indicium of rankings for each indicium of PSD and each indicium of PBP or BW, of each frequency set of frequency spectrum(s), are added or summed. A single set of set(s) of frequency spectrum(s), where each set of frequency spectrum(s) has a determined summed indicium of rank, is created.

Optionally, in block 990E, the set(s) of frequency spectrum(s) are ranked based upon the summed indicia of rankings. In block 990F, whether there is only one set of frequency spectrum(s) (in rankings) is determined. If there is only one determined set of frequency spectrum(s), then, in block 990G, the one set of frequency spectrum(s) is selected as the frequency spectrum allocated to identified color(s) assigned to nodes of the selected identified connected set. If there is more than one set of frequency spectrums, then in block 990H, two sets of frequency spectrums having the highest summed indicia of rankings are selected. In block 990I, one set, of the two sets of frequency spectrum(s) (having a lowest dispersion, e.g., standard deviation, of power spectral densities (PSD) values, for each frequency spectrum of the set, around a MPSD value for the set) is determined and selected as the frequency spectrum allocated to identified color(s) assigned to nodes of the selected identified connected set.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a method for efficiently enhancing a function of an indicium of an aggregate of a product of bandwidth and maximum transmit power spectral density allocated to each of at least one general authorized access (GAA) radio, the method comprising: receiving co-existence data about at least the one GAA radio; identifying zero or more edges, wherein an edge is formed between two nodes, wherein an edge means that a criterion of interference at a GAA radio or a node consisting of at least one GAA radio exceeds an edge interference threshold level; generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free mean a level of interference below a threshold level of interference, wherein the allocating the frequency spectrum and maximum transmit power comprises: identifying at least one protection point having an indicium of aggregate reduction of transmission power above a first indicium threshold level; for each identified protection point, determining at least one GAA radio having an indicium of a reduction of transmission power greater than a transmission power reduction threshold level, where each identified GAA radio comprises a node of a connected set; for at least one identified protection point, obtaining a diminished number of sets of at least one frequency spectrum for each connected set for the determined at least one GAA radio; for each obtained set of at least one frequency spectrum, determining an indicium of aggregate reduction of transmission power for GAA radios that are geographically located in a neighborhood of a corresponding identified protection point; and for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

Example 2 includes the method of Example 1, wherein allocating the frequency spectrum and the maximum transmit power further comprises identifying at least one protection point having an indicium of aggregate reduction of transmission power above a second indicium threshold level.

Example 3 includes the method of any of Examples 1-2, wherein the co-existence data further compromises data about at least one of: at least one incumbent user and at least one geographic region to be maintained interference free.

Example 4 includes the method of any of Examples 1-3, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

Example 5 includes the method of any of Examples 1-4, further comprising determining at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset; wherein at least allocating a frequency spectrum and a maximum transmit power is performed in parallel for each interference group.

Example 6 includes the method of Example 5, wherein determining the at least one interference group is performed prior to identifying the zero or more edges; wherein identifying the zero or more edges, generating the at least one network graph, and allocating the frequency spectrum and the maximum transmit power are performed in parallel for each interference group.

Example 7 includes a non-transitory computer readable medium storing a program causing at least one processor to execute a process, the process comprising: receiving co-existence data about at least the one GAA radio; identifying zero or more edges, wherein an edge is formed between two nodes, wherein an edge means that a criterion of interference at a GAA radio or a node consisting of at least one GAA radio exceeds an edge interference threshold level; generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises: identifying at least one protection point having an indicium of aggregate reduction of transmission power above a first indicium threshold level; for each identified protection point, determining at least one GAA radio having an indicium of a reduction of transmission power greater than a transmission power reduction threshold level, where each identified GAA radio comprises a node of a connected set; for at least one identified protection point, obtaining a diminished number of sets of at least one frequency spectrum for each connected set for the determined at least one GAA radio; for each obtained set of at least one frequency spectrum, determining an indicium of aggregate reduction of transmission power for GAA radios that are geographically located in a neighborhood of a corresponding identified protection point; and for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

Example 8 includes the non-transitory computer readable medium of Example 7, wherein allocating the frequency spectrum and the maximum transmit power further comprises identifying at least one protection point having an indicium of aggregate reduction of transmission power above a second indicium threshold level.

Example 9 includes the non-transitory computer readable medium of any of Examples 7-8, wherein the co-existence data further compromises data about at least one of: at least one incumbent user and at least one geographic region to be maintained interference free.

Example 10 includes the non-transitory computer readable medium of any of Examples 7-9, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

Example 11 includes the non-transitory computer readable medium of any of Examples 7-10, the process further comprising determining at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset; wherein at least allocating a frequency spectrum and a maximum transmit power is performed in parallel for each interference group.

Example 12 includes the non-transitory computer readable medium of Example 11, wherein determining the at least one interference group is performed prior to identifying the zero or more edges; wherein identifying the zero or more edges, generating the at least one network graph, and allocating the frequency spectrum and the maximum transmit power are performed in parallel for each interference group.

Example 13 includes a system, comprising processing circuitry configured to: receive co-existence data about at least the one GAA radio; identify zero or more edges, wherein an edge is formed between two nodes, wherein an edge means that a criterion of interference at a GAA radio or a node consisting of at least one GAA radio exceeds an edge interference threshold level; generate at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set; at a planned time, allocate a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises: identify at least one protection point having an indicium of aggregate reduction of transmission power above a first indicium threshold level; for each identified protection point, determine at least one GAA radio having an indicium of a reduction of transmission power greater than a transmission power reduction threshold level, where each identified GAA radio comprises a node of a connected set; for at least one identified protection point, obtain a diminished number of sets of at least one frequency spectrum for each connected set for the determined at least one GAA radio; for each obtained set of at least one frequency spectrum, determine an indicium of aggregate reduction of transmission power for GAA radios that are geographically located in a neighborhood of a corresponding identified protection point; and for at least one identified protection point, select an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

Example 14 includes the system of Example 13, wherein allocating the frequency spectrum and the maximum transmit power further comprises identify at least one protection point having an indicium of aggregate reduction of transmission power above a second indicium threshold level.

Example 15 includes the system of any of Examples 13-14, wherein the co-existence data further compromises data about at least one of: at least one incumbent user and at least one geographic region to be maintained interference free.

Example 16 includes the system of any of Example 13-15, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

Example 17 includes the system of any of Examples 13-16, wherein the processing circuitry is further configured to determine at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset; wherein at least allocating a frequency spectrum and a maximum transmit power is performed in parallel for each interference group.

Example 18 includes the system of Example 17, wherein determining the at least one interference group is performed prior to identifying the zero or more edges; wherein identifying the zero or more edges, generating the at least one network graph, and allocating the frequency spectrum and the maximum transmit power are performed in parallel for each interference group.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for efficiently enhancing a function of an indicium of an aggregate of a product of bandwidth and maximum transmit power spectral density allocated to each of at least one general authorized access (GAA) radio, the method comprising:
receiving co-existence data about at least the one GAA radio;
identifying zero or more edges, wherein an edge is formed between two nodes, wherein an edge means that a criterion of interference at a GAA radio or a node consisting of at least one GAA radio exceeds an edge interference threshold level;
generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set;
at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free mean a level of interference below a threshold level of interference, wherein the allocating the frequency spectrum and maximum transmit power comprises:
identifying at least one protection point having an indicium of aggregate reduction of transmission power above a first indicium threshold level;
for each identified protection point, determining at least one GAA radio having an indicium of a reduction of transmission power greater than a transmission power reduction threshold level, where each identified GAA radio comprises a node of a connected set;
for at least one identified protection point, obtaining a diminished number of sets of at least one frequency spectrum for each connected set for the determined at least one GAA radio;
for each obtained set of at least one frequency spectrum, determining an indicium of aggregate reduction of transmission power for GAA radios that are geographically located in a neighborhood of a corresponding identified protection point; and
for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and
sending the allocated frequency spectrum maximum transmit power to each authorized radio which is configured to have a transmit power, in the shared spectrum, not exceeding a corresponding determined maximum transmit power.

2. The method of claim 1, wherein allocating the frequency spectrum and the maximum transmit power further comprises identifying at least one protection point having an indicium of aggregate reduction of transmission power above a second indicium threshold level.

3. The method of claim 1, wherein the co-existence data further compromises data about at least one of: at least one incumbent user and at least one geographic region to be maintained interference free.

4. The method of claim 1, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

5. The method of claim 1, further comprising determining at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset;
wherein at least allocating a frequency spectrum and a maximum transmit power is performed in parallel for each interference group.

6. The method of claim 5, wherein determining the at least one interference group is performed prior to identifying the zero or more edges;
wherein identifying the zero or more edges, generating the at least one network graph, and allocating the frequency spectrum and the maximum transmit power are performed in parallel for each interference group.

7. A non-transitory computer readable medium storing a program causing at least one processor to execute a process, the process comprising:
receiving co-existence data about at least the one GAA radio;
identifying zero or more edges, wherein an edge is formed between two nodes, wherein an edge means that a criterion of interference at a GAA radio or a node consisting of at least one GAA radio exceeds an edge interference threshold level;
generating at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set;

at a planned time, allocating a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises:

identifying at least one protection point having an indicium of aggregate reduction of transmission power above a first indicium threshold level;

for each identified protection point, determining at least one GAA radio having an indicium of a reduction of transmission power greater than a transmission power reduction threshold level, where each identified GAA radio comprises a node of a connected set;

for at least one identified protection point, obtaining a diminished number of sets of at least one frequency spectrum for each connected set for the determined at least one GAA radio;

for each obtained set of at least one frequency spectrum, determining an indicium of aggregate reduction of transmission power for GAA radios that are geographically located in a neighborhood of a corresponding identified protection point; and for at least one identified protection point, selecting an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

8. The non-transitory computer readable medium of claim 7, wherein allocating the frequency spectrum and the maximum transmit power further comprises identifying at least one protection point having an indicium of aggregate reduction of transmission power above a second indicium threshold level.

9. The non-transitory computer readable medium of claim 7, wherein the co-existence data further compromises data about at least one of: at least one incumbent user and at least one geographic region to be maintained interference free.

10. The non-transitory computer readable medium of claim 7, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

11. The non-transitory computer readable medium of claim 7, the process further comprising determining at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset;

wherein at least allocating a frequency spectrum and a maximum transmit power is performed in parallel for each interference group.

12. The non-transitory computer readable medium of claim 11, wherein determining the at least one interference group is performed prior to identifying the zero or more edges;

wherein identifying the zero or more edges, generating the at least one network graph, and allocating the frequency spectrum and the maximum transmit power are performed in parallel for each interference group.

13. A system, comprising processing circuitry configured to:

receive co-existence data about at least the one GAA radio;

identify zero or more edges, wherein an edge is formed between two nodes, wherein an edge means that a criterion of interference at a GAA radio or a node consisting of at least one GAA radio exceeds an edge interference threshold level;

generate at least one network graph, wherein a network graph means at least one connected set where there are no pairs of nodes that are connected with an edge and have a same color, and wherein a connected set means a unique set of at least two nodes where at least two of the at least two nodes have an edge, or a unique node with no edge to any other node, where each node of the at least two nodes having an edge are assigned different colors, and where a number of colors assigned to nodes of the connected set is a minimum number of colors which can be assigned to each node of the connected set;

at a planned time, allocate a frequency spectrum and a maximum transmit power, in shared spectrum, to each of at least one GAA radio so that GAA radios, and each identified protection point, are free of interference from each of the at least one GAA radio, wherein free of interference and interference free means a level of interference below a threshold level of interference, wherein the allocating the frequency spectrum and maximum transmit power comprises:

identify at least one protection point having an indicium of aggregate reduction of transmission power above a first indicium threshold level;

for each identified protection point, determine at least one GAA radio having an indicium of a reduction of transmission power greater than a transmission power reduction threshold level, where each identified GAA radio comprises a node of a connected set;

for at least one identified protection point, obtain a diminished number of sets of at least one frequency spectrum for each connected set for the determined at least one GAA radio;

for each obtained set of at least one frequency spectrum, determine an indicium of aggregate reduction of transmission power for GAA radios that are geographically located in a neighborhood of a corresponding identified protection point; and for at least one identified protection point, select an obtained set that has an enhanced function of an indicium of an aggregate of a product of bandwidth and maximum transmit power of each GAA radio authorized to transmit in the shared spectrum and geographically located in a neighborhood of a protection point; and sending the allocated frequency spectrum maximum transmit power to each authorized radio which is configured to have a transmit power, in the shared spectrum, not exceeding a corresponding determined maximum transmit power.

14. The system of claim 13, wherein allocating the frequency spectrum and the maximum transmit power further comprises identify at least one protection point having an indicium of aggregate reduction of transmission power above a second indicium threshold level.

15. The system of claim 13, wherein the co-existence data further compromises data about at least one of: at least one incumbent user and at least one geographic region to be maintained interference free.

16. The system of claim 13, further comprising identifying zero or more protection points each of which has an indicium of aggregate reduction of transmission power that exceeds a first indicium threshold level, wherein a neighborhood of each identified protection point encompasses a geographic location of at least one GAA radio, and wherein the neighborhood of each protection point means a geographic area centered around a corresponding protection point.

17. The system of claim 13, wherein the processing circuitry is further configured to determine at least one interference group, wherein an interference group means (a) each nodeset comprising at least one node where each of the at least one node comprises at least one GAA radio geographically located in a joint area, or (b) a nodeset comprising at least one node, where each node of the nodeset comprises at least one GAA radio, and where none of GAA radios of a node of the nodeset are geographically located in a joint area, wherein a joint area means a union of neighborhoods of one or more protection points, wherein at least one GAA radio, of at least one node of the nodeset, is geographically located in at least one neighborhood of the union of neighborhoods, and wherein a nodeset means at least two nodes, where each node of nodeset is within a first distance of at least one other node of the nodeset;

wherein at least allocating a frequency spectrum and a maximum transmit power is performed in parallel for each interference group.

18. The system of claim 17, wherein determining the at least one interference group is performed prior to identifying the zero or more edges;

wherein identifying the zero or more edges, generating the at least one network graph, and allocating the frequency spectrum and the maximum transmit power are performed in parallel for each interference group.

* * * * *